(12) United States Patent
Scholl et al.

(10) Patent No.: US 12,433,460 B2
(45) Date of Patent: Oct. 7, 2025

(54) CLEANING APPARATUS WITH FLOW DEFLECTION ELEMENT WITH MODE FILTER

(71) Applicant: Alfred Kärcher SE & Co. KG, Winnenden (DE)

(72) Inventors: Dominik Scholl, Winnenden (DE); Florian Ebert, Winnenden (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 0 days.

(21) Appl. No.: 18/647,375

(22) Filed: Apr. 26, 2024

(65) Prior Publication Data

US 2024/0341548 A1 Oct. 17, 2024

Related U.S. Application Data

(63) Continuation of application No. PCT/EP2022/078792, filed on Oct. 17, 2022.

(30) Foreign Application Priority Data

Oct. 28, 2021 (DE) .......................... 102021128207.1

(51) Int. Cl.
| | | |
|---|---|---|
| *A47L 9/00* | (2006.01) | |
| *A47L 11/40* | (2006.01) | |
| *F24F 13/24* | (2006.01) | |
| *G10K 11/172* | (2006.01) | |

(52) U.S. Cl.
CPC ......... *A47L 9/0081* (2013.01); *A47L 11/4097* (2013.01); *F24F 13/24* (2013.01); *G10K 11/172* (2013.01)

(58) Field of Classification Search
CPC .... A47L 9/0081; A47L 11/4097; F24F 13/24; G10K 11/172
See application file for complete search history.

(56) References Cited

U.S. PATENT DOCUMENTS

| | | | |
|---|---|---|---|
| 4,475,264 A | 10/1984 | Schulz | |
| 5,728,980 A * | 3/1998 | Zarnick | ............... F24F 13/0281 |
| | | | 181/224 |

(Continued)

FOREIGN PATENT DOCUMENTS

| | | |
|---|---|---|
| DE | 36 30 710 A1 | 3/1988 |
| DE | 10 2017 111 910 A1 | 12/2018 |

(Continued)

*Primary Examiner* — Forrest M Phillips
(74) *Attorney, Agent, or Firm* — Womble Bond Dickinson (US) LLP

(57) ABSTRACT

A cleaning apparatus is provided, including at least one noise source and an air guidance device having at least one flow deflection element, wherein the at least one flow deflection element has a first duct arm and a second duct arm, wherein the second duct arm is oriented transversely to the first duct arm, and wherein, during operation of the cleaning apparatus, there is sound propagation from the first duct arm to the second duct arm, wherein a mode filter device for transverse modes of sound propagation is arranged at the at least one flow deflection element, having at least one mode filter that is positioned at the second duct arm.

47 Claims, 28 Drawing Sheets

(56) References Cited

U.S. PATENT DOCUMENTS

| | | | | |
|---|---|---|---|---|
| 7,032,383 | B2* | 4/2006 | Weber | F02B 33/40 |
| | | | | 60/696 |
| 8,146,706 | B2* | 4/2012 | Katoh | B60H 1/00564 |
| | | | | 454/143 |
| 8,516,986 | B2* | 8/2013 | Silvano | F02M 35/10118 |
| | | | | 123/184.53 |
| 9,605,631 | B2* | 3/2017 | Zirkelbach | F02M 35/1216 |
| 9,719,404 | B2* | 8/2017 | Yamamoto | F01N 1/00 |
| 9,759,439 | B2* | 9/2017 | Uhlenbusch | F24F 8/158 |
| 10,119,634 | B1* | 11/2018 | Khanzadian | B32B 3/06 |
| 10,704,726 | B2* | 7/2020 | Lin | F15D 1/04 |
| 10,907,590 | B2* | 2/2021 | Tange | F02M 35/10262 |
| 10,954,901 | B2* | 3/2021 | Kimura | F02M 35/10111 |
| 11,421,911 | B2* | 8/2022 | Fitzsimmons | G10K 11/168 |
| 2002/0084138 | A1* | 7/2002 | Weinstein | F15D 1/04 |
| | | | | 181/268 |
| 2009/0200103 | A1* | 8/2009 | Potschka | F16L 55/0336 |
| | | | | 181/224 |
| 2011/0168482 | A1* | 7/2011 | Merchant | F02C 7/045 |
| | | | | 181/224 |
| 2012/0292127 | A1* | 11/2012 | Teshima | F02M 35/1238 |
| | | | | 181/224 |
| 2016/0201691 | A1 | 7/2016 | Ebert et al. | |
| 2017/0219153 | A1 | 8/2017 | Hill et al. | |
| 2017/0340178 | A1* | 11/2017 | Ebert | A47L 9/20 |

FOREIGN PATENT DOCUMENTS

| | | |
|---|---|---|
| DE | 10 2018 108 559 A1 | 10/2019 |
| FR | 2 911 660 | 7/2008 |
| WO | WO 2018/068850 | 4/2018 |

* cited by examiner

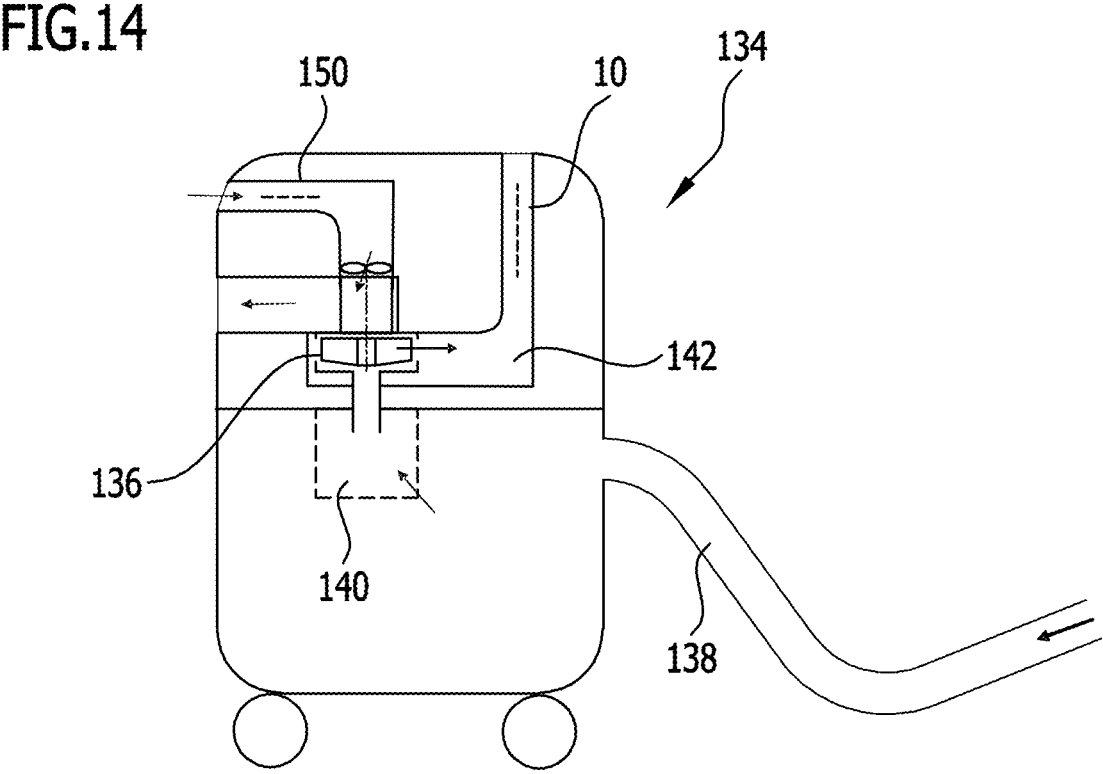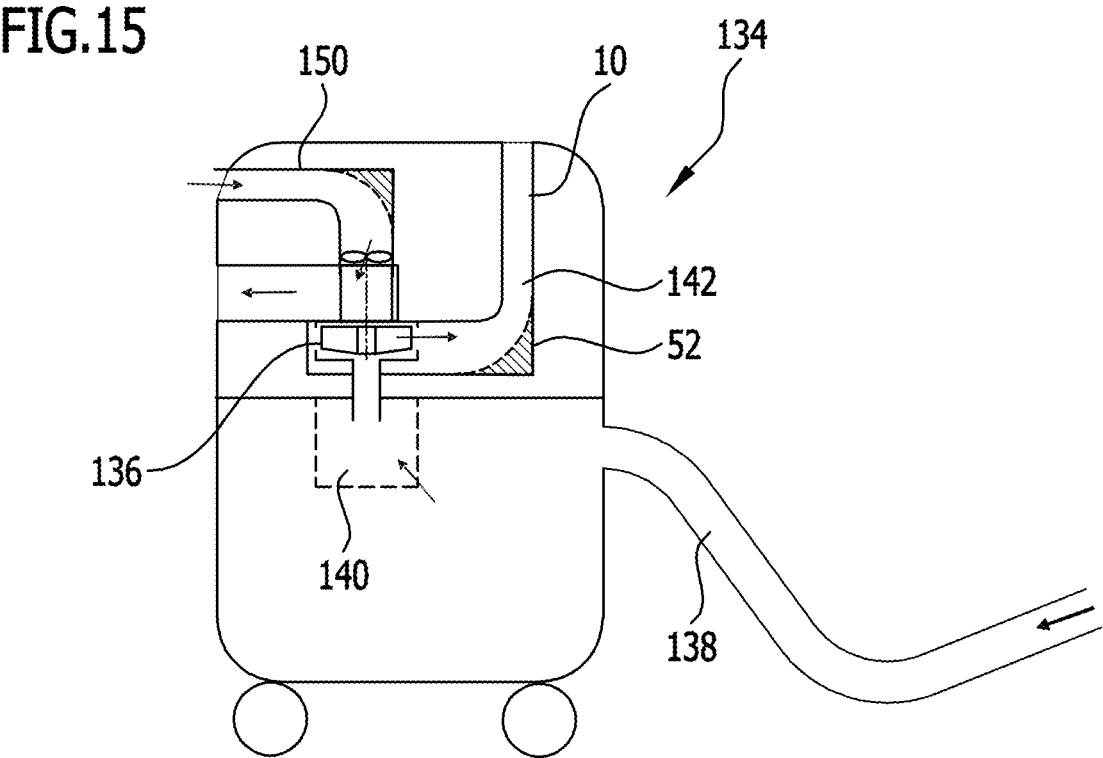

CLEANING APPARATUS WITH FLOW DEFLECTION ELEMENT WITH MODE FILTER

CROSS-REFERENCE TO RELATED APPLICATIONS

This application is a continuation of international application number PCT/EP2022/078792, filed on Oct. 17, 2022, and claims the benefit of German application number 10 2021 128 207.1, filed on Oct. 28, 2021, which are incorporated herein by reference in their entirety and for all purposes.

BACKGROUND OF THE INVENTION

The invention relates to a cleaning apparatus, comprising at least one noise source and an air guidance device having at least one flow deflection element, wherein the at least one flow deflection element has a first duct arm and a second duct arm, wherein the second duct arm is oriented transversely to the first duct arm, and wherein, during operation of the cleaning apparatus, there is sound propagation from the first duct arm to the second duct arm.

U.S. Pat. No. 4,475,264 discloses a muffler for a truck.

DE 36 30 710 A1 discloses an absorptive sound attenuator which is arranged in the dust-conveying line of a hand-held vacuum cleaner with downstream filter.

DE 10 2017 111 910 A1 discloses a cleaning device, comprising a tonal-noise source, a flow guidance device and a noise-reducing device, which is coupled to the flow guidance device. The noise-reducing device comprises at least one $\lambda/4$ resonator, which is adapted to the tonal-noise source, wherein the at least one $\lambda/4$ resonator is connected to at least one of the following devices: (i) at least one sound attenuator; (ii) a nozzle.

DE 10 2018 108 559 A1 discloses a cleaning device comprising at least one noise source, an air guidance device acted upon by sound, and a noise-reducing device that is arranged on the air guidance device, wherein the noise-reducing device comprises a combination comprising at least a perforated-plate resonator and a flow deflection element.

WO 2018/068850 A1 discloses a cleaning device, comprising at least one noise source and an air guidance device having at least one flow deflection element, wherein the at least one flow deflection element has a first arm with a first inlet duct and a second arm with an outlet duct, the outlet duct is oriented transversely to the inlet duct, the inlet duct has an inlet that extends in a first depth direction and a first width direction, the outlet duct has an outlet with a depth in a second depth direction and a width in a second width direction, the first depth direction and the second depth direction are oriented parallel to one another, and the first width direction and the second width direction are oriented transversely to one another, wherein the width in the second width direction is at least 1.2 times the depth in the second depth direction.

Known from WO 2015/043641 A1 is a suction apparatus comprising a fan device for generating a suction air stream, and an air guidance device that has at least one flow deflection element having an inlet duct and an outlet duct, wherein the outlet duct is oriented transversely to the inlet duct. Arranged at a region of transition from the inlet duct to the outlet duct is an acoustic mirror device at which sound is reflected and/or sound is absorbed.

Known from WO 2016/112959 is a suction device comprising a suction assembly, a dirt-collection container, a filter device, and a cleaning-off device for the filter device, wherein the cleaning-off device forms a noise source for noise emissions in a frequency range below 2,000 Hz, and at least one perforated-plate resonator is associated with the cleaning-off device.

In accordance with an embodiment of the invention, a cleaning apparatus of the type mentioned in the introduction is provided, which has effective sound attenuation at the same time as a high degree of flow efficiency.

SUMMARY OF THE INVENTION

In accordance with an embodiment of the invention, provision is made in the case of the cleaning apparatus of the type mentioned in the introduction that a mode filter device for transverse modes of sound propagation is arranged at the at least one flow deflection element, having at least one mode filter that is positioned at the second duct arm.

In the flow deflection element there occurs flow guidance and in particular guidance of an air stream. Further, sound propagation occurs in the at least one flow deflection element.

Fundamentally, sound can propagate in the at least one flow deflection element as a fundamental mode and as a first-order transverse mode and as higher-order transverse modes.

Transverse modes arise at a region of transition from the first duct arm to the second duct arm and then propagate in the second duct arm.

It has been found that if a mode filter for transverse modes is arranged at the second duct arm, transverse modes are accordingly suppressed, and effective sound attenuation is produced.

In this context, reference is made to the dissertation "Acoustic and aerodynamic phenomena in duct bends", which is not a prior publication, by Dominik Scholl, Institute for Acoustics and Building Physics at the University of Stuttgart, 2021. The dissertation is explicitly referenced in its entirety.

In particular, the at least one flow deflection element has a sound deflection region for sound propagation from the first duct arm to the second duct arm, and in respect of sound propagation at least one mode filter for transverse modes is arranged downstream of the sound deflection region. Transverse modes arise at the sound deflection region, and these can be effectively attenuated at the second duct arm by the corresponding mode filter.

It is favorable if at least one of the following is provided:
the at least one mode filter which is positioned at the second duct arm is at a spacing from a sound deflection region;
the at least one mode filter which is positioned at the second duct arm is at a spacing from the first duct arm;
a spacing of the at least one mode filter which is arranged at the second duct arm is at least 0.1 times and in particular at least 0.15 times (and preferably at least 0.2 times and preferably at least 0.3 times and preferably at least 0.4 times and preferably at least 0.5 times and preferably at least 0.6 times and preferably at least 0.7 times and preferably at least 0.8 times) a first width of the first duct arm in a first width direction or a second width of the second duct arm in a second width direction, wherein the spacing is parallel to a first width direction and relates to a side of the first duct arm that lies at an internal corner region of the at least one flow deflection element.

It has been found that this enables effective mode filtering for transverse modes with effective sound attenuation to be achieved.

It may also be provided for the mode filter device to comprise at least one mode filter for transverse modes which is arranged at the first duct arm. A mode filter for transverse modes that is arranged at the second duct arm has the greater effect, as a result of transverse modes arising as the sound is deflected.

It is favorable if the first duct arm has a first opening that extends in a first width direction and a first depth direction, wherein the first depth direction is perpendicular to the first width direction, and the second duct arm has a second opening that extends in a second width direction and a second depth direction perpendicular to the second width direction, having at least one of the following:
- the first width direction and the second width direction are transverse and in particular perpendicular to one another;
- the first depth direction and the second depth direction are at least approximately parallel to one another;
- the first depth direction and the second width direction are perpendicular to one another;
- the second depth direction and the first width direction are perpendicular to one another.

These indications accordingly determine the geometric relationships.

It is particularly advantageous if, during the propagation of sound through the at least one flow deflection element during operation of the cleaning apparatus, transverse modes that propagate in the first width direction and second width direction and transverse modes that propagate in the first depth direction and second depth direction may fundamentally be formed. Typically, transverse modes have a cutoff frequency. Below this cutoff frequency, these modes are evanescent and cannot propagate (that is to say, they drop off exponentially).

In that case, it is in particular provided for the at least one mode filter at the second duct arm to take a form for filtering transverse modes in the second width direction. These are the first transverse mode, the second transverse mode and so on. The transverse modes in the second depth direction are fundamentally also present, but do not play a major part in respect of sound attenuation.

A mode filter of the mode filter device for transverse modes is or comprises at least one of the following:
- an absorptive sound attenuator;
- a chamber-type sound attenuator;
- a perforated device that is positioned in an interior of the at least one flow deflection element.

The absorptive sound attenuator or chamber-type sound attenuator or perforated device is arranged in particular at the second duct arm. It may also be provided for a corresponding mode filter additionally to be arranged at the first duct arm. Fundamentally, it is also possible for a plurality of types of these mode filters to be used at the same time.

In an advantageous embodiment, the absorptive sound attenuator has material that is absorptive in relation to sound and is in particular arranged as an absorptive layer. This enables effective sound attenuation for transverse modes to be achieved.

For this purpose, it is in particular provided for the absorptive material to be flush with an inner side of the at least one flow deflection element, or to be set back in relation to an inner side of the at least one flow deflection element. In the case of being set back, the absorptive sound attenuator also takes the form of a chamber-type sound attenuator (with appropriate dimensions).

This enables effective mode filtering for transverse modes to be achieved.

In particular, the absorptive sound attenuator has at least one of the following parameters:
- a thickness of the absorptive material is at least 0.1 times, and in particular at least 0.15 times, and in particular at least 0.2 times, and in particular at least 0.25 times a width of the first duct arm or the second duct arm;
- a length of the absorptive sound attenuator parallel to a direction of extent of the duct arm at which the absorptive sound attenuator is arranged is at least 1.5 times, and in particular at least twice, and in particular at least 2.3 times a width of the first duct arm or the second duct arm;
- a spacing of the absorptive sound attenuator that is arranged at the second duct arm is at least 0.1 times a width of the first duct arm or the second duct arm.

If at least one of these parameters is fulfilled, effective mode filtering for transverse modes is produced, and accordingly a high level of transmission loss of the acoustic pressure—that is to say, effective sound attenuation.

In one embodiment, the chamber-type sound attenuator has a chamber that forms a widening in cross section at the duct element at which the chamber-type sound attenuator is arranged. With appropriate dimensions, this enables effective mode filtering to be achieved.

In particular, the chamber-type sound attenuator has at least one of the following parameters:
- a width of the chamber is at least twice a width of the first duct arm or the second duct arm;
- a length of the chamber-type sound attenuator parallel to a direction of extent of the duct arm at which the chamber-type sound attenuator is arranged is at least 1.2 times a width of the first duct arm and the second duct arm;
- a spacing of the chamber-type sound attenuator that is arranged at the second duct arm from the first duct arm is at least 0.1 times and in particular at least 0.15 times and in particular at least 0.5 times a width of the first duct arm or the second duct arm.

If at least one of these parameters is fulfilled, effective mode filtering is produced.

It is favorable if, in the case of the perforated device, at least one of the following is present:
- openings in the perforated device have an opening width of less than or equal to 1 mm;
- an opening density is greater than or equal to 10 openings per square centimeter;
- a wall thickness of the perforated device transversely to a width direction of the duct arm at which the perforated device is arranged is at least 1 mm.

With an appropriate configuration of the perforated device, it is likewise possible to implement a mode filter for transverse modes. In particular in this case, the perforated device is arranged in a through-flow region of the corresponding duct arm.

It is favorable if at least one of the following is provided:
- the perforated device is or comprises one or more plates provided with openings;
- the perforated device comprises one or more open-pore structures;
- an open-pore structure takes the form of a block;

an open-pore structure is a foam structure and in particular an absorbent foam structure and/or a fiber material structure such as a nonwoven structure.

In this way, a mode filter can be implemented in a simple manner. For example, the perforated device comprises one or more plates that are accordingly provided with perforations (openings). In particular, the openings are open in relation to a width direction of the respective duct arm at which the perforated device is located. For example, a plate is arranged centrally in the corresponding duct arm and in so doing oriented for example parallel to a direction of extent of the corresponding duct arm. It is also possible for example for a plurality of plates that are at a spacing from one another to be correspondingly positioned in the interior. In particular, in that case it is possible for fluid to flow through in an intermediate space between the plates.

The perforated device may also comprise one or more open-pore structures in order to implement a corresponding mode filter. In particular, an open-pore structure takes the form of a block and may in this case be plate-like in form. An open-pore structure may for example be a foam structure and in particular an absorbent foam structure or a fiber material structure. As a result of using an absorbent foam structure, it is also possible in addition to achieve sound absorption at the perforated device. The fiber material structure may be for example a nonwoven structure. Fundamentally, a woven structure or knitted structure are for example also possible.

In this context, it may be provided for the absorptive sound attenuator or the chamber-type sound attenuator or the perforated device to take a form for attenuation of transverse modes only in a width direction. In particular in that case, no construction is present for attenuating transverse modes in the depth direction, which play only a subordinate part.

It is favorable for effective noise reduction if the first duct arm has a first opening and the second duct arm has a second opening, and a ratio of a first width of the first opening to a second width of the second opening is greater than 1.

It has been found that this enables a relatively high total transmission loss for the acoustic pressure (integrated over all frequencies).

This is attributable to the fact that evanescent modes arise—that is to say modes that cannot propagate—and accordingly greater transmission loss occurs.

In this context, reference is made explicitly and in its entirety to the dissertation "Acoustic and aerodynamic phenomena in duct bends", which is not a prior publication, by Dominik Scholl, Institute for Acoustics and Building Physics at the University of Stuttgart, 2021.

In order to achieve relatively great (total) transmission losses in respect of the acoustic pressure, it is advantageous if the ratio is greater than or equal to 1.2 and in particular greater than or equal to 1.4 and in particular greater than or equal to 1.5.

It has been found that the influence on through-flow can be kept relatively small if the ratio is less than or equal to 3, and in particular less than or equal to 2.8, and in particular less than or equal to 2.6, and in particular less than or equal to 2.5.

In an advantageous embodiment, in which effective total transmission loss is achieved in respect of the acoustic pressure and good flow efficiency is achieved, the ratio is between 1.5 (inclusive) and 2 (inclusive).

It is in particular provided for the first opening to be an inlet opening for sound, and for the second opening to be an outlet opening for sound, and during operation of the cleaning apparatus for sound propagation to be from the first opening to the second opening. Sound is as it were fed in at the first opening and output (in attenuated form) at the second opening. In that case, in respect of sound propagation the first opening is closest to the at least one noise source. In principle, it is possible for the air stream to flow from the first opening to the second opening. However, it is also possible conversely for the air stream to flow from the second opening to the first opening. The influence that the direction of flow of the air stream in the at least one flow deflection element has on sound propagation is relatively small.

It is favorable if at least one of the following is provided:
 the first duct arm extends in a first direction of extent that is a direction normal to the first opening;
 the second duct arm extends in a second direction of extent that is a direction normal to the second opening;
 the first direction of extent and the second direction of extent are transverse and in particular perpendicular to one another;
 a first width direction, in which the first width is measured, is transverse and in particular perpendicular to the first direction of extent;
 a second width direction, in which the second width is measured, is transverse and in particular perpendicular to the second direction of extent;
 the first width direction and the second direction of extent are at least approximately parallel to one another;
 the second width direction and the first direction of extent are at least approximately parallel to one another;
 the first opening has an extent in a first depth direction that is perpendicular to the first width direction and transverse and in particular perpendicular to the second width direction;
 the second opening has an extent in a second depth direction that is oriented perpendicular to the second width direction and transverse and in particular perpendicular to the first width direction;
 the first width direction and the second width direction lie in a plane to which the first depth direction and the second depth direction are oriented transversely and in particular perpendicular.

As a result, the flow deflection element takes the form of an acoustic angle, wherein in particular the first duct arm and the second duct arm are perpendicular to one another. As a result of the mentioned geometric relationships, the first opening and the second opening are oriented transversely to one another.

Fundamentally, it is provided for the first width of the first opening to relate to a rectangular envelope which has sides having an extent in a first width direction and in a depth direction perpendicular to the first width direction, and for the second width of the second opening to relate to a rectangular envelope which has sides having an extent in a second width direction and in a second depth direction perpendicular to the second width direction. The first opening and the second opening need not necessarily be rectangular or square in shape. In that case, the first width and the second width are defined in relation to the rectangular envelope.

For the same reason, it is favorable if the first opening has a rectangular envelope which has sides extending in a first width direction and in a first depth direction perpendicular to the first width direction, and the second opening has a rectangular envelope which has sides extending in a second width direction and in a second depth direction perpendicular to the second width direction.

It is favorable if at least one of the following is provided:

the first duct arm has a uniform cross section from the first opening to a region of transition to the second duct arm;

the second duct arm has a uniform cross section from the second opening to a region of transition to the first duct arm.

As a result, the corresponding flow deflection element can be manufactured and also dimensioned in a simple manner.

In a structurally favorable simple embodiment, at least one of the following is provided:

the first opening has a rectangular or square cross section;

the first duct arm has a rectangular or square internal cross section;

the second opening has a rectangular or square cross section;

the second duct arm has a rectangular or square internal cross section.

In an advantageous embodiment, the at least one flow deflection element takes a flat form. As a result, at least one of the following is provided:

the second width of the second opening is at least 1.2 times as large as a second depth of the second opening in a second depth direction perpendicular to a second width direction in which the second width is measured, and is in particular at least 1.9 times as large;

the first width of the first opening is at least 1.2 times as large as a first depth of the first opening in a first depth direction perpendicular to a first width direction in which the first width is measured, and is in particular at least 1.9 times as large.

This produces a high degree of flow efficiency and also a broad band sound attenuation. In this context, reference is made to WO 2018/068850 A1.

In an advantageous embodiment, at an external corner region the first duct arm and the second duct arm have a common edge that extends in a depth direction, transversely to a first width direction and transversely to a second width direction. This produces effective sound attenuation at the region of transition from the first duct arm to the second duct arm. In particular, this enables a type of sound reflection to be achieved, wherein transverse modes arise.

This enables effective acoustic pressure reduction to be achieved.

In an advantageous embodiment, a region of transition from the first duct arm to the second duct arm has a curved wall, in particular having at least one of the following:

the curved wall lies opposite a common edge of the first duct arm and the second duct arm;

an internal radius at the curved wall is greater than half of a hydraulic diameter of the first duct arm.

This produces a high degree of flow efficiency. Pressure losses during flow through the at least one flow deflection element can be kept small.

In particular, at least one of the following is provided:

the noise source is a fan or pump;

the air guidance device is a guidance device for process air or cooling air;

the air guidance device is a guidance device for cleaning air, and in particular blown air;

the air guidance device is a guidance device for drying air.

In particular, the air guidance device is connected to the at least one noise source, as a fan, and in addition to its configuration as a noise source, the fan is also a source in particular for a blown stream or a suction-air stream.

The cleaning apparatus advantageously has a tool for application to a surface that is to be cleaned. This application tool may be a nozzle (such as a pressure nozzle or suction nozzle), such as a suction nozzle in the case of a vacuum cleaner or a pressure nozzle in the case of a leaf blower. It may be a roller from which for example moisture is removed by suction, or a squeegee in the case of a swabbing machine.

In one embodiment, the at least one application tool is coupled to the air guidance device. In the case of a corresponding nozzle, this is coupled directly to the air guidance device. In the case of wet-floor cleaning, it may for example be provided for a cleaning roller to have moisture removed from it by suction and thus to be coupled to the air guidance device.

The cleaning apparatus may take the form of a portable cleaning device or a fixed cleaning apparatus such as a gantry wash. The cleaning device may be self-propelling and self-steering, or take the form of a vehicle. It may be hand-held and/or manually guided.

For example, the cleaning apparatus takes the form of a high-pressure cleaner, sweeper, floor-cleaning machine, swabbing machine, suction device, window vacuum cleaner, hand-held and/or manually guided wet-floor cleaning machine, leaf blower, steamer, or gantry wash.

A high degree of noise reduction is produced if the first duct arm and the second duct arm have a common edge at an external corner region.

A high degree of flow efficiency is produced if arranged in an interior of the at least one flow deflection element is a built-in wall which covers the edge in the interior, if the built-in wall faces a through-flow region in the interior, and if the built-in wall takes a form such that it guides flow and is sound-permeable.

As a result of the first duct arm and the second duct arm abutting against one another with the edge at the external corner region, effective noise reduction is produced by corresponding sound attenuation.

By providing the built-in wall in sound-permeable form, this effect of effective noise reduction as a result of the form taken by the edge is retained. As a result of the flow-guiding (flow-conducting) function of the built-in wall, a high degree of flow efficiency is produced, since the corresponding fluid stream that is guided through by the at least one flow deflection element is guided past in front of the edge.

According to the invention, a flow deflection element is provided that brings about effective sound attenuation at the same time as a high degree of flow efficiency. In this context, reference is made to the dissertation "Acoustic and aerodynamic phenomena in duct bends", which is not a prior publication, by Dominik Scholl, Institute for Acoustics and Building Physics at the University of Stuttgart, 2021.

It is favorable if the built-in wall abuts against an inner side of the first duct arm and an inner side of the second duct arm. This produces effective flow guidance.

In one embodiment, at least one of the following is provided:

a transition of the built-in wall to an inner side of the first duct arm and the second duct arm is in each case smooth and in particular free of edges;

the built-in wall takes a form such that it is curved facing the through-flow region, and in particular is concavely curved.

This produces an effective flow-conducting function with a high degree of flow efficiency. In particular, turbulence of the fluidic flow at the transition from the built-in wall to an inner side of the duct arm is at least kept low.

It is favorable if at least one of the following is present:

the built-in wall is or comprises a perforated element and in particular a perforated panel element or block element;

the built-in wall is or comprises a porous foam element or fiber material element;

an opening width of openings in the built-in wall toward the edge is at least $\lambda/50$, where $\lambda$ is an upper sound wavelength of relevance to noise emission;

an opening width of openings in the built-in wall toward the edge is at least 1 mm.

The built-in wall comprises sound-permeable openings. The built-in wall may be a perforated element, in particular a panel element or block element such as a sheet-metal element. It is also possible for the built-in wall to be or to comprise a porous foam element or fiber material element, and for example for the entire space of the through-flow region up to the edge to be filled.

It is favorable if an opening width of openings (for example perforations or pores) in the built-in wall is at least $\lambda/50$ for an upper sound wavelength of relevance to noise emission. This enables sound permeability toward the edge to be achieved. In particular, the opening width is at least 1 mm.

The edge is in particular a connection line between opposing external corners of the at least one flow deflection element. It is favorable if, at the edge, the first duct arm and the second duct arm are at an angle of between 70° and 110° and in particular at an angle of between 80° and 100°.

In an advantageous embodiment, the first duct arm and the second duct arm meet perpendicular to one another.

In a structurally simple embodiment, the built-in wall has a constant curvature—that is to say that, in particular toward the through-flow region thereof, it takes the shape of a portion of a cylinder outer face. In that case, simple manufacturability is produced at the same time as a high degree of flow efficiency.

It is favorable if a center point of a circle of curvature for the built-in wall lies between the first duct arm and the second duct arm. This produces a structurally simple configuration.

It has proved favorable if a region of transition from the first duct arm to the second duct arm has, at an internal corner region which lies opposite the external corner region, a wall that is curved relative to the interior of the at least one flow deflection element. This produces a high degree of flow efficiency.

In particular, the curved wall lies opposite the built-in wall, and a through-flow region in the interior lies between the curved wall and the built-in wall. The built-in wall and the curved wall conduct flow of the stream that flows through the through-flow region.

In an advantageous embodiment, the curved wall has a constant curvature.

It has proved favorable for a high degree of flow efficiency if a circle of curvature for the curved wall has an internal radius that is greater than half of a hydraulic diameter of a first opening of the first duct arm.

In a structurally favorable embodiment, the curved wall and the built-in wall are oriented parallel and have in particular a common center point.

In particular here, the built-in wall is oriented parallel to a first depth direction and/or parallel to a second depth direction, and is of uniform height in the first depth direction and/or the second depth direction. This produces a high degree of flow efficiency.

According to the invention, the use of a flow deflection element that has a first duct arm and a second duct arm, wherein the second duct arm is oriented transversely to the first duct arm and wherein, during operation of the cleaning apparatus, there is sound propagation from the first duct arm to the second duct arm, and wherein a mode filter device for transverse modes is arranged at the flow deflection element, having at least one mode filter that is positioned at the second duct arm, is provided in the case of a cleaning apparatus with a noise source.

This produces effective noise reduction.

The advantages of the use according to the invention were explained above in the context of the cleaning apparatus according to the invention.

Further advantageous embodiments were likewise explained above in the context of the cleaning apparatus according to the invention.

In particular, air flows through the flow deflection element during operation of the cleaning apparatus. The flow deflection element is thus a deflection element for both fluid flow and for sound propagation.

The description below of preferred embodiments serves, in conjunction with the drawings, to explain the invention in more detail.

BRIEF DESCRIPTION OF THE DRAWINGS

FIGS. 12 to 15 show, schematically, an exemplary embodiment of a suction device with different flow deflection elements according to the invention;

DETAILED DESCRIPTION OF THE INVENTION

A cleaning apparatus according to the invention, of which exemplary embodiments are shown in FIGS. 12 to 47 and are explained in more detail below, comprises a (at least one) noise source. The noise source is a generator of sound.

An example of a noise source of this kind is a fan having at least one rotating impeller. Depending on the application, the fan serves for example to generate a suction stream or a blown stream. The cleaning apparatus comprises an air guidance device in order to guide an air stream. The air guidance device is coupled to the noise source and can fundamentally propagate sound in the air guidance device.

Connected to the air guidance device is a (at least one) flow deflection element, or the air guidance device comprises such a flow deflection element.

Figure 1:
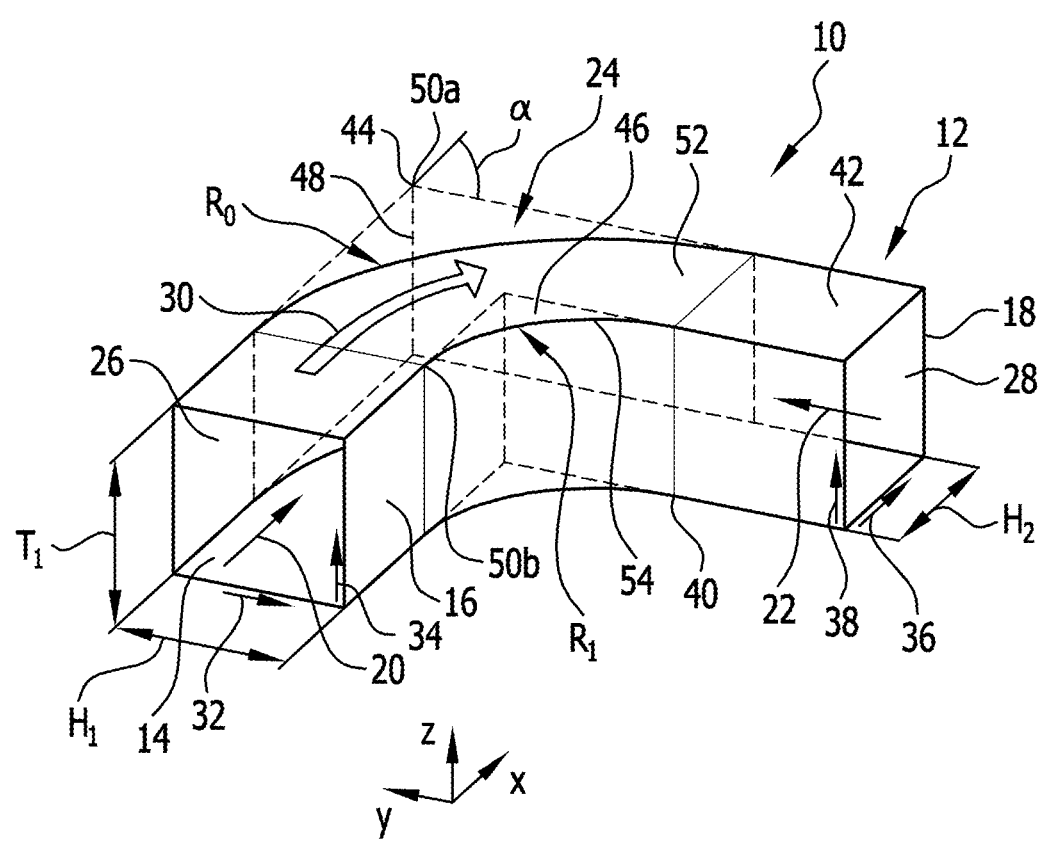
FIG. 1 shows an exemplary embodiment of a flow deflection element, in a perspective illustration.

One exemplary embodiment of a flow deflection element of this kind is shown in FIG. 1 and designated 10. The flow deflection element 12 serves to reduce noise emission by the cleaning apparatus. Flow deflection elements of this kind are therefore also designated as acoustic angles. The object of the flow deflection element 10 is to bring about the greatest possible acoustic loss. However, at the same time throughput through the air guidance device should not be substantially impaired by flow through the at least one flow deflection element 10.

Furthermore, it is advantageous if flow noise that is generated in the flow deflection element 10 itself during operation of the cleaning apparatus is minimized.

The flow deflection element 10 takes the form of a duct 12 with an interior 14 configured to be flowed through. The flow deflection element 10 has a first duct arm 16 and a second duct arm 18.

In one exemplary embodiment, the first duct arm 16 extends in a first direction of extent 20. The second duct arm 18 extends in a second direction of extent 22.

In particular, the first duct arm 16 extends out of a region 24 of transition into the second duct arm 18, in a straight line along the first direction of extent 20. Accordingly, the second duct arm 18 extends out of the region 24 of transition into the first duct arm 16, in a straight line along the second direction of extent 22.

The first duct arm 16 and the second duct arm 18 are oriented transversely and in particular perpendicular to one another. The first direction of extent 20 and the second direction of extent 22 are transverse to one another, being in particular perpendicular to one another.

The first duct arm 16 has a first opening 26. The first opening 26 is at a spacing from the region 24 of transition. The second duct arm 18 has a second opening 28. This is at a spacing from the region 24 of transition.

At the first opening 26, sound is fed into the duct 12. At the second opening 28, sound is output from the duct 12.

The first opening 26 may be an inlet opening for an air stream and the second opening 28 an outlet opening for the air stream, or the second opening 28 is an inlet opening for the air stream and the first opening 26 an outlet opening.

By way of the first opening 26, the flow deflection element 10 is connected to the air guidance device of the cleaning device such that sound is generated, as an input side for sound propagation. Furthermore, the flow deflection element 10 is connected to the air guidance device of the cleaning apparatus by way of the second opening 28 such that sound is generated, as an output side. This is explained in more detail below with reference to embodiments of cleaning apparatus.

During operation of the cleaning apparatus, an air stream 30 flows in a direction for example from the first opening 26 to the second opening 28, or from the second opening 28 to the first opening 26.

A (surface) normal to the first opening 26 is parallel to the first direction of extent 20. A (surface) normal to the second opening 28 is parallel to the second direction of extent 22.

The first opening 26 and the second opening 28 are oriented transversely and in particular perpendicular to one another, in accordance with the orientation of the directions of extent 20 and 22.

In the exemplary embodiment according to FIG. 1, the first opening 26 and the second opening 28 each have a square or rectangular cross section. At the respective opening 26 and 28, the first opening 26 and the second opening 28 have an envelope that is square or rectangular, wherein sides of these envelopes coincide with delimitation sides of the respective opening 26 and 28.

The first duct arm 16 has, at least toward the region 24 of transition, a uniform cross section corresponding to the cross section at the first opening 26. Furthermore, the second duct arm 18 has, at least as far as the region 24 of transition, a uniform cross section corresponding to the cross section of the second opening 28.

The first opening 26 has, in a first width direction 32, a first width $H_1$. In a first depth direction 34, the first opening 26 has a first depth $T_1$. The first depth direction 34 is located perpendicular to the first width direction 32.

The first opening 26 extends by a width $H_1$ in the first width direction 32 and by a depth $T_1$ in the first depth direction 34.

Correspondingly, the second opening 28 has a width $H_2$ in a second width direction 36 and a depth $T_2$ in a second depth direction 38. The second depth direction 38 is located perpendicular to the second width direction 36.

The first width direction 32 and the second width direction 36 are located transversely and in particular perpendicular to one another.

The first depth direction 34 and the second depth direction 38 are located at least approximately parallel to one another. The first depth direction 34 and the second width direction 36 are perpendicular to one another. The second depth direction 38 and the first width direction 32 are perpendicular to one another.

The first width direction 32 and the first depth direction 34 are each perpendicular to the first direction of extent 20. The second width direction 36 and the second depth direction 38 are each perpendicular to the second direction of extent 22.

The first width direction 32 is at least approximately parallel to the second direction of extent 22. The first depth direction 34 is perpendicular to the second direction of extent 22. The second width direction 36 is at least approximately parallel to the first direction of extent 20. The second depth direction 38 is located perpendicular to the first direction of extent 20.

The flow deflection element 10 has a first delimitation plane 40 and, at a spacing, an opposing second delimitation plane 42. In one exemplary embodiment, the first delimitation plane 40 and the second delimitation plane 42 are parallel to one another (FIG. 1). The first width direction 32 and the second width direction 36 are preferably located in the same plane and are parallel to the first delimitation plane 40 and the second delimitation plane 42.

The first depth direction 34 and the second depth direction 38 are located transversely and in particular perpendicular to the first delimitation plane 40 and the second delimitation plane 42.

At the region 24 of transition, the flow deflection element 10 has an external corner region 44 and an internal corner region 46. Formed at the external corner region 44 between the first duct arm 16 and the second duct arm 18, for sound reduction, is an edge 48. This edge 48 is a (straight) connection line between opposing corners 50a, 50b of the flow deflection element 10. The corners 50a, 50b are located at a region of connection between the first duct arm 16 and the second duct arm 18. The corner 50a is located on the second delimitation plane 42, and the corner 50b is located on the first delimitation plane 40.

In one exemplary embodiment, arranged in the interior 14 is a built-in wall 52, which guides flow along it and at the same time covers the edge 48 in the interior 14 in relation to flow guidance. The built-in wall 52 is flow-conducting and at the same time sound-permeable.

In particular, the built-in wall 52 is curved toward the interior 14, with a radius $R_0$.

In relation to sound absorption, however, the edge 48 is effective, because of the sound permeability of the built-in wall 52.

In one exemplary embodiment, the flow deflection element 10 comprises a curved wall 54 at the region 24 of transition, at the internal corner region 46. The wall 54 is curved at least relative to the interior 14 and has for example a constant curvature, and has a radius $R_1$.

In one exemplary embodiment, it is provided for the internal radius $R_1$ of this curved wall 54 to be greater than half of a hydraulic diameter of the first duct arm 16.

Fundamentally, the first duct arm 16 and the second duct arm 18 may be located at an angle α to one another in respect of their directions of extent 20, 22. Preferably, this angle α is 90°—that is to say that the first direction of extent 20 and the second direction of extent 22 are perpendicular to one another.

Figure 2:
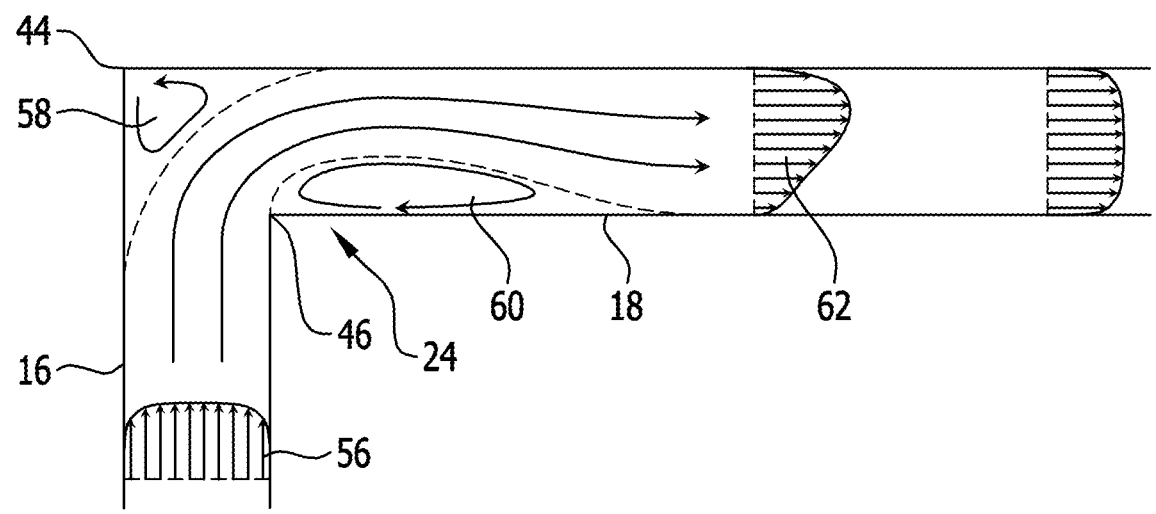
FIG. 2 shows, schematically and by way of example, flow conditions in the case of a flow deflection element according to FIG. 1, in a sectional illustration.
Figure 3:
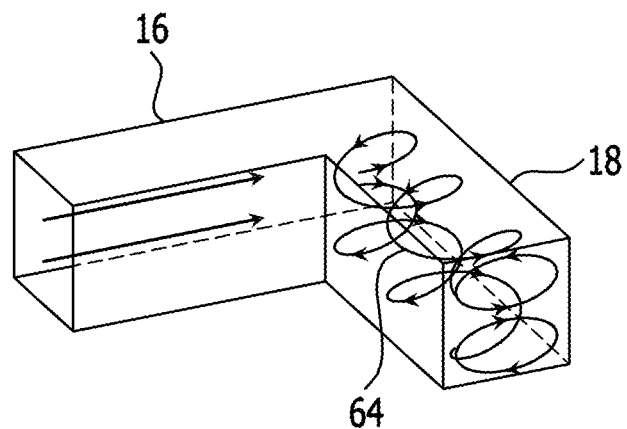
FIG. 3 shows, likewise schematically, flow conditions in the case of a flow deflection element according to FIG. 1, in a perspective view.

In FIGS. 2 and 3, the basic flow conditions that may occur when there is flow through the flow deflection element 10 (with the edge 48 and an edge at the internal corner region 46) are shown schematically shown. In this context, reference is made to the dissertation by Dominik Scholl in "Acoustic and aerodynamic phenomena in duct bends", Institute for Acoustics and Building Physics at the University of Stuttgart, 2021, which is not a prior publication, and in particular Chapter 2 there, "Flow efficiency of duct bends". This document is explicitly referenced.

As fluid flows through the first duct arm 16, a flow profile 56 has a velocity gradient close to the wall.

In the external corner region 44, a dead zone 58 for the flow zone may be formed. In the second duct arm 18, a flow separation zone 60 may be formed at the region 24 of transition, downstream of the internal corner region 46.

In the second duct arm 18, flow with a distorted flow profile 62 may fundamentally be formed.

In particular, it is also possible for a secondary stream 64 (see FIG. 3) to be formed in the second duct arm 18. Fundamentally, turbulent flows that may be formed (FIGS. 2 and 3) result in undesired losses of pressure. Such pressure losses may be kept small by appropriate flow guidance, in particular using the curved wall 54 and the built-in wall 52.

By coupling the flow deflection element 10 to the air guidance device of the cleaning apparatus, with the air guidance device in turn coupled to the noise source of the cleaning apparatus, it is fundamentally possible for sound waves to propagate through the duct 12.

Fundamentally, sound waves have a fundamental mode which propagates in the x direction (along the direction of extent 20 or 22). Fundamental modes are schematically shown in FIG. 4 in the line designated (1).

Figure 4:
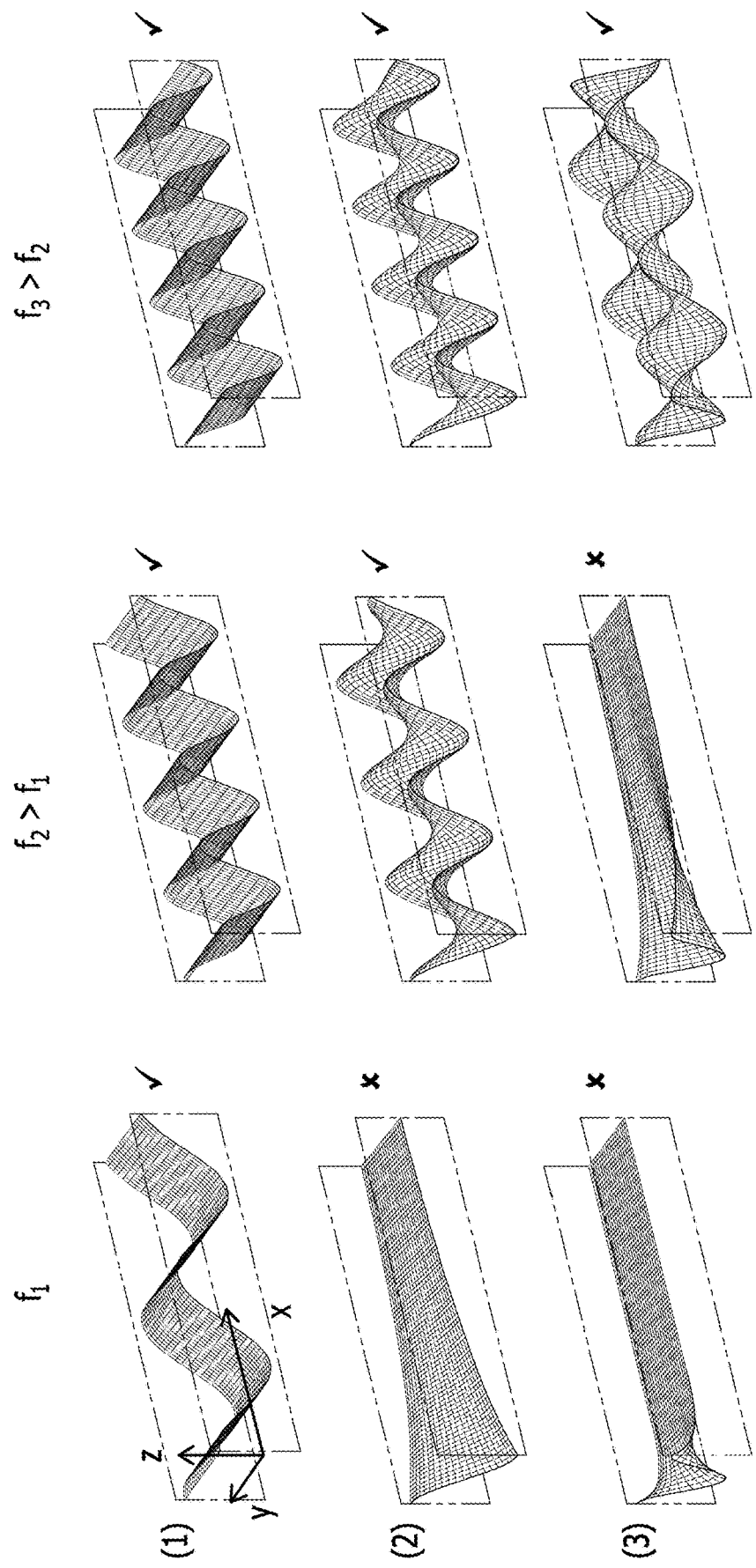
FIG. 4 shows, schematically, fundamental modes (1), which may be formed in a duct arm at different frequencies $f_1$, $f_2$, $f_3$ during sound propagation in a duct arm of the flow deflection element according to FIG. 1, first transverse modes (2) and second transverse modes (3) in a width direction at the corresponding different frequencies (evanescent transverse modes that cannot propagate in the duct arm at the corresponding frequency are marked with a cross)

As well, transverse modes may arise, and these may propagate in a y direction according to FIG. 4 (see also FIG. 1) and in a z direction.

The x direction is parallel to the width direction 32 or 36, and the z direction is parallel to the depth direction 34 or 38. Of transverse modes, there are "width transverse modes", which propagate in the y direction, and "depth modes", which propagate in the z direction. The depth modes play a subordinate part in sound attenuation, and so are not further discussed below. Nor are the depth modes shown in FIG. 4.

Columns (2) and (3) show (width) transverse modes (1st transverse mode, 2nd transverse mode) of sound propagation that correspond to different frequencies.

Frequency $f_1$ is 3,300 Hz, frequency $f_2$ is 6,700 Hz, and frequency $f_3$ is 8,000 Hz. The acoustic pressure is shown. Of the transverse modes, there are the first order ("first transverse mode") and higher orders such as the second transverse mode, etc.

Transverse modes have a lower cutoff frequency below which they do not propagate, or at which an evanescent sound propagation is then present. In FIG. 4, a cross next to the illustration of the acoustic pressure course indicates that the mode is evanescent—that is to say cannot propagate. This means for example that at frequency $f_1$ the first transverse mode (line (2)) and the second transverse mode (line (3)) cannot be formed, only the fundamental mode.

It can be seen that at frequency $f_2$ the fundamental mode and the first transverse mode can be formed, and at frequency $f_3$ the fundamental mode, the first transverse mode and the second transverse mode can be formed.

An essential element of the sound attenuation by the flow deflection element 10 is that at the region 24 of transition, and in particular at the external corner region 44, fundamental modes are at least partly converted into transverse modes. As a result, on exiting at the second opening 28, there is a reduction in acoustic pressure, or a transmission loss for the acoustic pressure, on passing through the flow deflection element 10.

In this context, reference is made to the dissertation by Dominik Scholl for which the details are given above.

In particular for reducing pressure losses in the flow, it is advantageous if the flow deflection element 10 takes a flat form, inasmuch as the second width $H_2$ is larger than the depth $T_2$, and in particular at least 1.2 times as large, and preferably at least 1.9 times as large. Correspondingly, the width $H_1$ takes a form larger than the depth $T_1$. In this context, reference is explicitly made to WO 2018/068850 A1.

In a first aspect of the solution according to the invention, the first width $H_1$ at the first opening 26 is larger than the second width $H_2$ at the second opening 28—that is to say that the ratio $H_1/H_2$ is greater than 1. It has proved advantageous if this ratio is greater than or equal to 1.2 and in particular greater than or equal to 1.4 and in particular greater than or equal to 1.5.

Further, in order to enable a configuration with sufficient flow throughput, it is favorable if this ratio $H_1/H_2$ is less than or equal to 3 and in particular less than or equal to 2.8 and in particular less than or equal to 2.6 and in particular less than or equal to 2.5.

It has been found that, in order on the one hand to enable a configuration with sufficient flow throughput and on the other to achieve a sufficient reduction in sound, it is particularly favorable if the ratio $H_1/H_2$ is in the (inclusive) range between 1.5 and 2.

Figure 5:
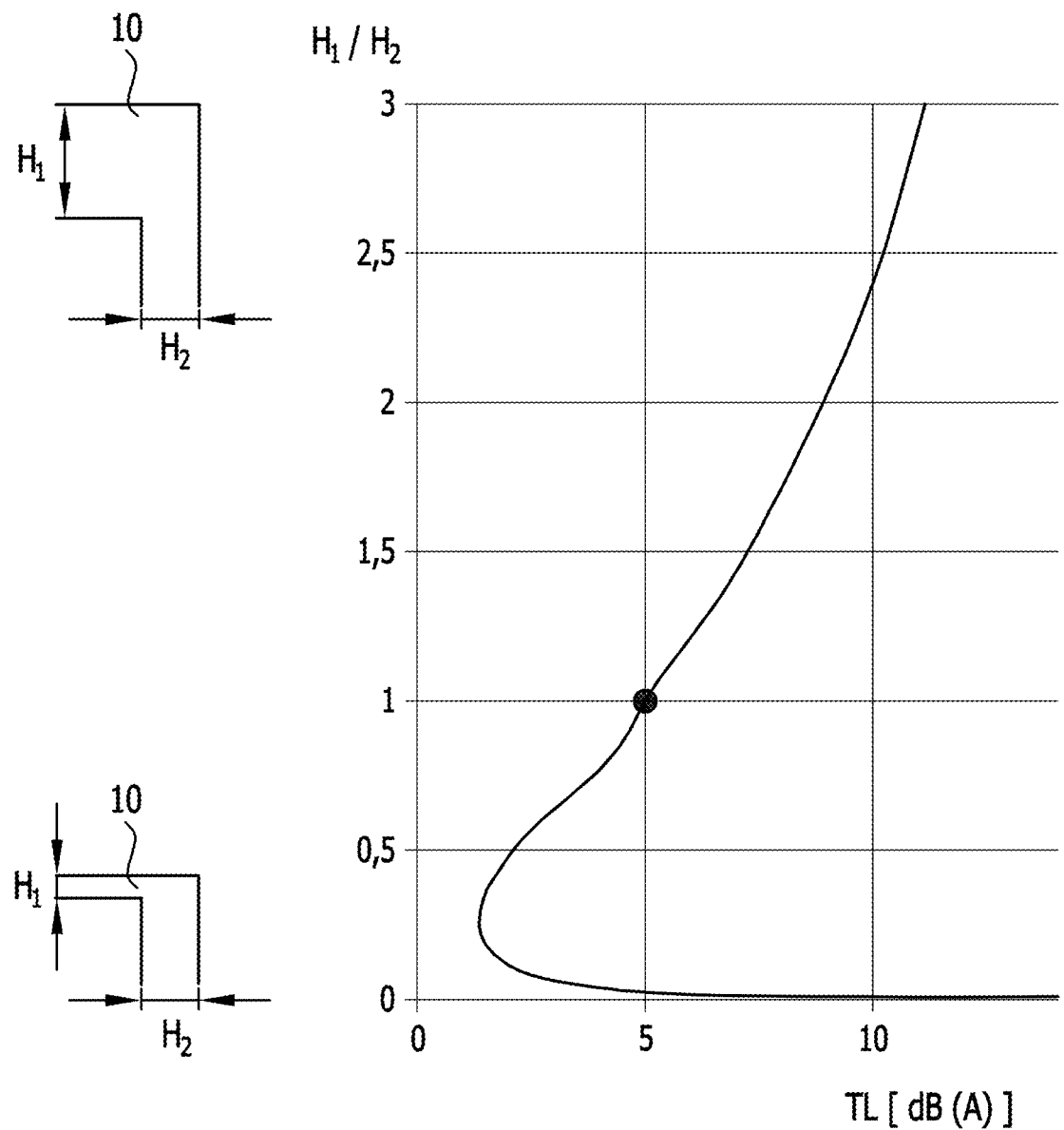
FIG. 5 shows a graph of the total transmission loss for a flow deflection element as a function of the ratio of a first width to a second width of the flow deflection element.

FIG. 5 shows the total transmission loss TL for the acoustic pressure on flow through the duct 12 (with a rectangular shape). Here, the total transmission loss is the transmission loss integrated over all frequencies. It is shown as a function of the parameter $H_1/H_2$—that is to say the ratio of the first width $H_1$ to the second width $H_2$.

The result here is a total transmission loss of more than 5 dB (A) when this ratio is greater than 1. It is fundamentally the case that the greater this ratio, the greater the total transmission loss. However, large values of this ratio result in sufficient flow throughput no longer being configurable (as indeed do very small values of this ratio).

For this reason, it is favorable if this ratio is greater than 1 and in particular greater than or equal to 1.5 and preferably less than or equal to 3 and in particular less than or equal to 2.

With optimized flow guidance (with relatively small pressure losses), the result is then effective sound attenuation.

The transmission losses (integrated over all frequencies) resulting from the greater width $H_1$ of the first opening 26 by comparison with the width $H_2$ of the second opening 28 are attributable to the excitation of evanescent modes, in particular in the first duct arm 16. As a result, additional peaks occur in the frequency-resolved transmission loss spectrum. In this context, reference is made to the above-mentioned dissertation by Dominik Scholl, and in particular to Chapters 1.2.4 and 1.2.5.

The above ratios have been described with reference to square or rectangular cross sections of the flow deflection element 10 (see FIG. 6(*a*)). They are also applicable to other cross sectional shapes of the flow deflection element 10.

Figure 6:
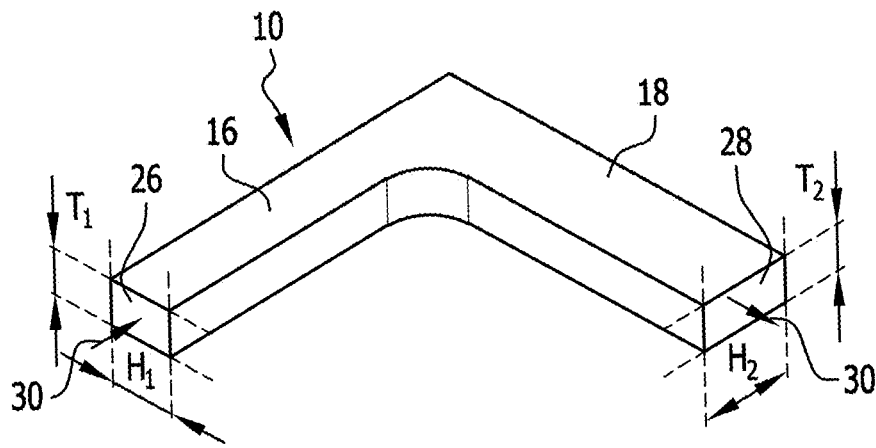
FIGS. 6(a) to 6(d) show different geometric configurations of the flow deflection element.
Figure 6:
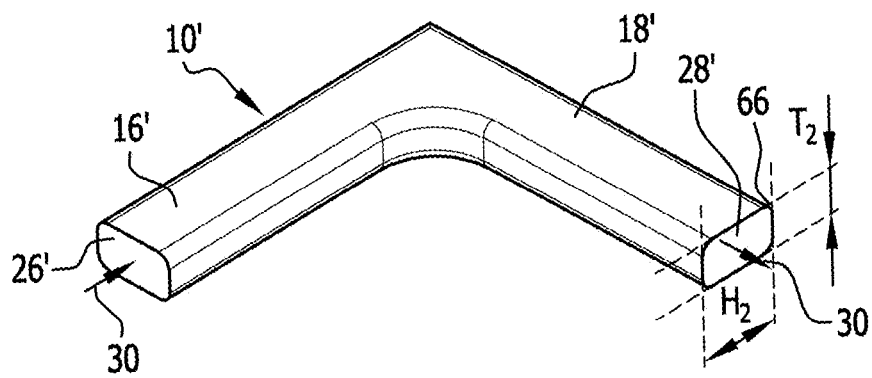
Figure 6:
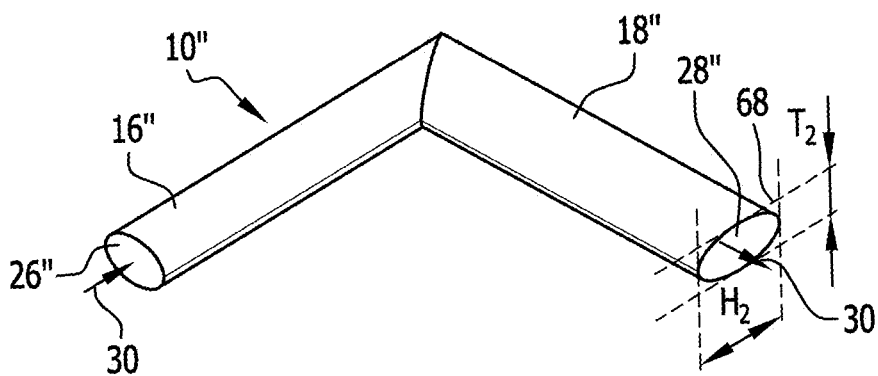
Figure 6:
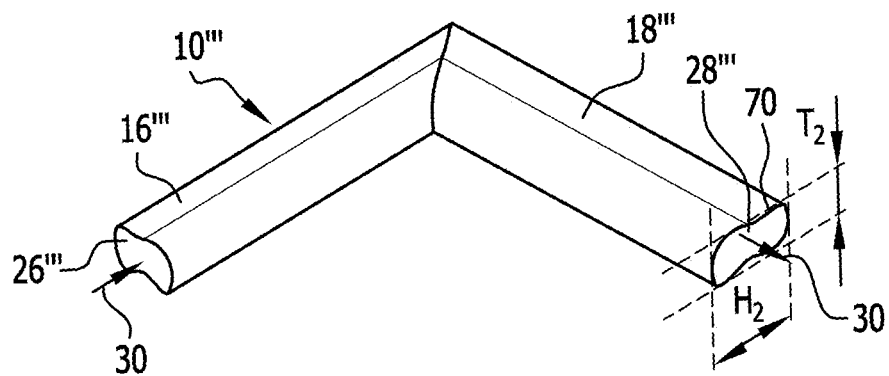

FIGS. 6(*b*), (*c*) and (*d*) show flow deflection elements 10', 10" and 10''' respectively.

In the case of the flow deflection element 10' according to FIG. 6(*b*), the rectangular shape is rounded. The first opening 26' and the second opening 28' each have an envelope 66 (shown only for the second opening 28' in FIG. 6(*b*)) that is a rectangle. The widths $H_2$ and $H_1$ relate to this envelope 66 in each case.

FIG. 6(*c*) shows a flow deflection element 10" that is oval or circular in shape.

The first opening 26" and the second opening 28" each have an envelope 68 that is rectangular. The widths $H_2$ and $H_1$ relate to the widths of these envelopes 68.

FIG. 6(*d*) shows a flow deflection element 10''' of which the cross section has a narrowing, and is in the shape of an eight on its side. The first opening 26''' and the second opening 28''' there each have a rectangular envelope 70. The second width $H_2$ and the first width $H_1$ each relate to this envelope 70.

The first aspect of the solution according to the invention, according to which the ratio of the first width $H_1$ and the second width $H_2$ is greater than 1, refers—where the corresponding openings are not themselves square or rectangular—to corresponding square and rectangular envelopes 66, 68, 70 at the respective openings 26' and 28', 26" and 28", and 26''' and 28''' respectively.

Figure 7:
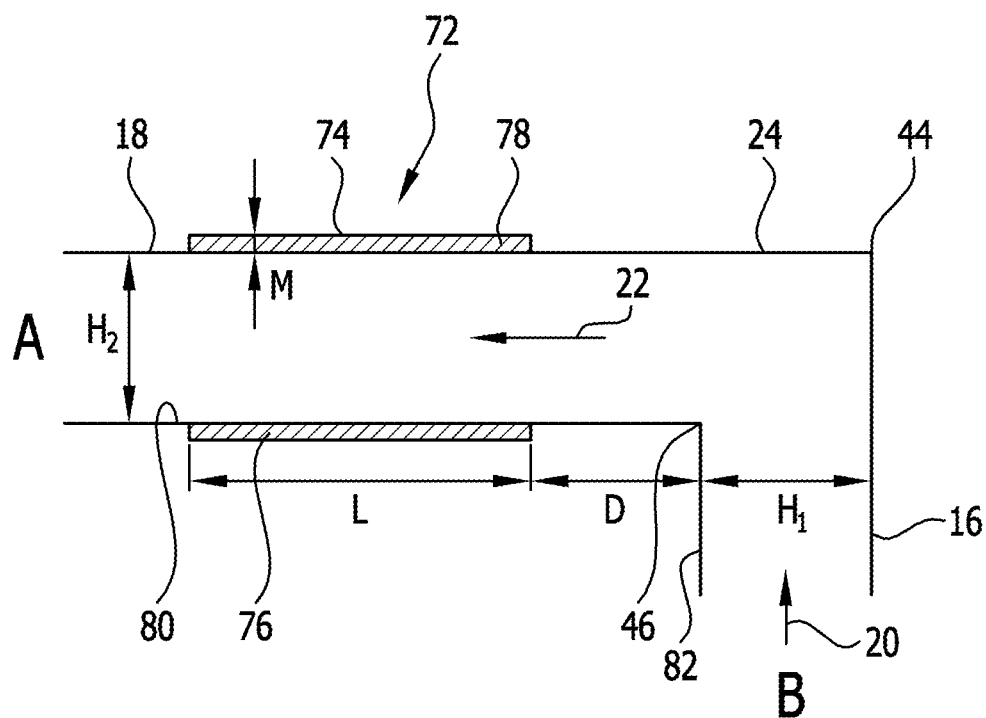
FIG. 7(a) shows, schematically, a cross section of an exemplary embodiment of a flow deflection element that is provided with a first embodiment of a mode filter.
FIG. 7(b) shows a similar view to FIG. 7(a), with a second exemplary embodiment of a mode filter.
FIG. 7(c) shows a similar view to FIG. 7(a), with a third exemplary embodiment of a mode filter.
Figure 7:
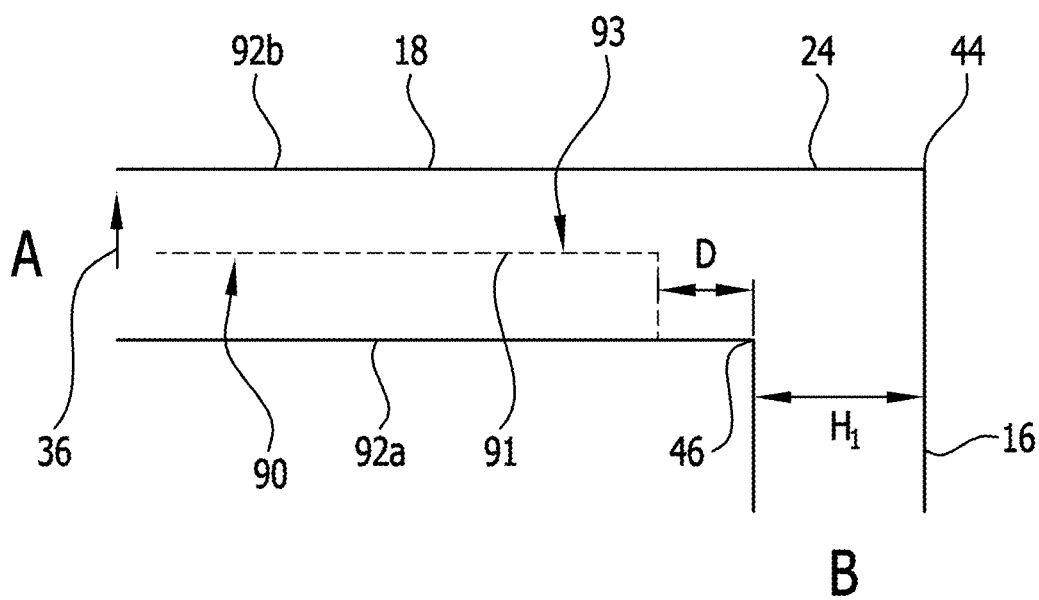
Figure 7:
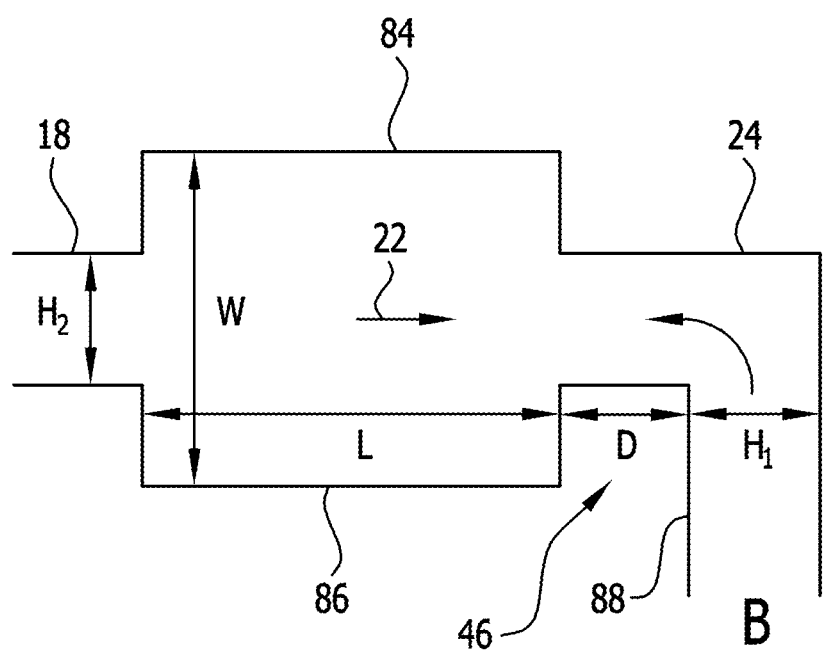
Figure 8:
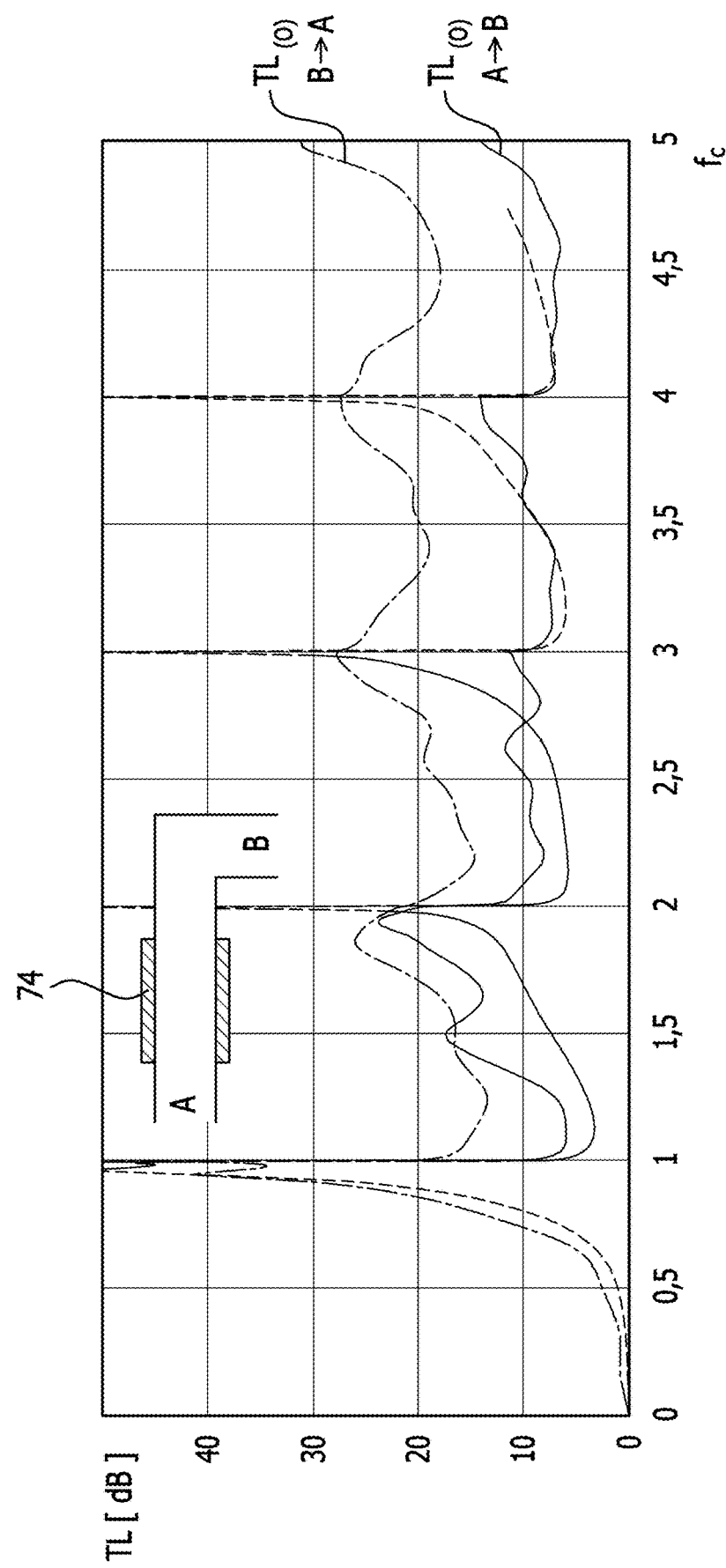
FIG. 8 shows a graph of a transmission loss as a function of a standardized frequency with a flow deflection element according to FIG. 7(a)

In a second aspect of the solution according to the invention, transverse modes in the second duct arm 18 are attenuated in a targeted manner (FIGS. 7, 8).

The corresponding flow deflection element 10 is provided with a mode filter device 72 for transverse modes. Here, at least one mode filter 74 (FIG. 7(*a*)) for transverse modes is provided, and is arranged on the second duct arm 18.

The mode filter device 72 is configured in particular to form width transverse modes—that is to say transverse modes that propagate in the y direction, under the geometric conditions according to FIG. 4.

As a result of the region 24 of transition, it is fundamentally possible for propagating transverse modes to be formed in the second duct arm 18, as described above. The fact that the mode filter device 72 has a mode filter 74 on the second duct arm 18 makes it possible for transverse modes to be filtered in a targeted manner in order to achieve a reduction in sound levels (sound attenuation).

Fundamentally, it is possible for a corresponding mode filter for transverse modes also to be arranged on the first duct arm 16, wherein the decisive influence of a mode filter 74 on transverse modes lies in the positioning thereof at the first duct arm 16.

In a first exemplary embodiment of a mode filter 74 for transverse modes, this mode filter 74 takes the form of an absorptive sound attenuator 76. The absorptive sound attenuator 76 has material 78 that is absorptive in relation to sound, such as a foam material. The absorptive material 78 takes a form or is arranged in particular as a layer.

The absorptive material 78 is arranged at an inner side 80 of the second duct arm 18 such that it is flush with this inner side 80 or set back in relation to this inner side.

In this case, it may fundamentally be provided for the absorptive material 78 to be arranged at the inner side 80 of the second duct arm 18 over the entire internal cross section.

It is also possible, and fundamentally sufficient for filtering width transverse modes, if the mode filter 74 for these transverse modes is positioned only in the second depth direction 38.

In its layer arrangement, the absorptive material 78 has a certain thickness M.

Furthermore, it has an extent of length L in the second direction of extent 22.

Basically, it is provided for the mode filter 74 to be at a spacing from the first duct arm 16 by a spacing D. In this arrangement, the spacing D is located between the mode filter 74 and an interface region between the first duct arm 16 and the second duct arm 18 at the internal corner region 46.

It has proved favorable if, in order to achieve effective filtering of transverse modes, this spacing D is at least 0.1 times and preferably at least 0.15 times the first width $H_1$ of the first duct arm 16.

In particular, a direction in which this spacing D is spaced is parallel to the second direction of extent 22 and parallel to the first width direction 32 and perpendicular to the second width direction 38.

Further, this spacing relates to a side 82 of the first duct arm 16 at the internal corner region 46.

It has proved favorable if the length L is at least 1.5 times and preferably at least 2.5 times the first width $H_1$ or the second width $H_2$.

In one exemplary embodiment, it is provided for the length L to be at most 2.5 times the first width $H_1$ or the second width $H_2$.

Further, it has proved favorable if the thickness M of the absorptive material 78 is at least 0.1 times the first width $H_1$ or the second width $H_2$. In one exemplary embodiment, this thickness M is at most 0.3 times the first width $H_1$ or the second width $H_2$.

In one concrete exemplary embodiment, in which the first width $H_1$ and the second width $H_2$ are of the same size, the thickness M is 0.2 $H_1$, the length L is 2·$H_1$, and the spacing D is 0.2 $H_1$.

FIG. 8 shows the transmission loss over a standardized frequency $f_c$ for the shown arrangement corresponding to the arrangement according to FIG. 7(a) of the mode filter 74. The standardized frequency $f_c$ is dimensionless and is defined as 2 $fH_1$/c, where c is the speed of sound and f is the frequency.

FIG. 8 shows the transmission loss for the sound propagation from B to A (that is to say from the first opening 26 in the direction of the second opening 28) and in the reverse direction (that is to say from the second opening 28 to the first opening 26). The effectiveness as a result of providing the mode filter 74 at the second duct arm 18 when flow is from the first opening 26 to the second opening 28 can be seen in the increase in transmission loss.

The effectiveness of sound attenuation by the region 24 of transition (by the transverse arrangement of the first duct arm 16 and the second duct arm 18) can be seen by comparing the curves, and the effectiveness of the mode filter 74 at the second duct arm 18 can then be seen from FIG. 8, wherein the flow is output at the second opening 28, at the second duct arm 18.

In this context, reference is made to the above-mentioned dissertation by Dominik Scholl, and in particular to Chapter 1.4.2 there.

In one exemplary embodiment, the mode filter device 72 comprises a mode filter 84 for transverse modes which is a chamber-type sound attenuator (FIG. 7(b)).

The mode filter 84 comprises a chamber 86 which is arranged at the second duct arm 18 and is spaced from the first duct arm 16 at a spacing D, to a side 88 of the first duct arm 16 that is located at the internal corner region 46.

The chamber 86 forms as it were a widening of the second duct arm 18. The chamber 86 has a width W that is larger than the second width $H_2$ of the second duct arm 18 outside the chamber 86; the chamber 86 forms a cross sectional widening on the second duct arm 18.

Fundamentally, this widening may be to all sides. For mode filtering of width transverse modes, it is sufficient if the chamber 86 has the same depth $T_2$ as the second duct arm 18 and is only widened in the second width direction 36.

The mode filter 84 (the chamber-type sound attenuator 84) has a length L parallel to the second direction of extent 22.

It is in particular provided for the spacing D to be at least 0.1 times and preferably at least 0.3 times the width $H_1$ or $H_2$.

In one concrete exemplary embodiment, the spacing D is $H_1$ or $H_2$.

It is provided for the width W of the chamber 86 in the second width direction 36 to be larger than the first width $H_1$ or the second width $H_2$. In particular, the width W is at least twice as large as the first width $H_1$ or the second width $H_2$.

In one concrete exemplary embodiment the width W is 3.15 $H_1$, and in another concrete exemplary embodiment the width W is 2.87 $H_2$, with the first width $H_1$ and the second width $H_2$ being the same in this concrete exemplary embodiment.

Further, it is provided for the length L of the chamber 86 to be larger than the first width $H_1$ or the second width $H_2$, and at least 1.2 times as large.

In one concrete exemplary embodiment, the length L=1.42×$H_1$ (where W=3.15 $H_1$). In another concrete exemplary embodiment, the length L=4.2 $H_1$ (where W=2.7 $H_1$).

In both the said concrete exemplary embodiments, the spacing D=$H_1$.

The mode filter device 72 with the mode filter 84 for transverse modes has fundamentally the same effects as the mode filter 74. First-order and indeed higher-order transverse modes are attenuated by the mode filter 84.

Another exemplary embodiment of a mode filter is a perforated device (90) that is arranged at the second duct arm 18 (FIG. 7(c)).

In one exemplary embodiment (FIG. 7(c)), this mode filter 90 for transverse modes is a plate 93 provided with openings 91. The plate 93 is arranged inside the second duct arm 18 and is in particular oriented parallel to the second depth direction 38; the mode filter 90 with the perforated plate 93 is oriented transversely and in particular perpendicular to the first width direction 32. A plane of the mode filter 90 is spanned as it were by vectors in the second depth direction 38 and the second direction of extent 22.

Preferably, the perforated plate 93 is arranged centrally such that its spacing from opposing sides 92a, 92b of the second duct arm 18 is the same.

The mode filter 90 (the plate 93) is located at a spacing D from the first duct arm 16 (see above with reference to the mode filters 74 and 84).

This spacing D is in particular at least 0.1 times the first width $H_1$ or the second width $H_2$.

The openings 91 in the plate 93 are in particular arranged such that they are open in the second width direction 36.

It is provided for the openings 91 in the plate 93 to have an opening width that is less than or equal to 1 mm.

It is furthermore in particular provided for an opening density to be greater than or equal to 10 openings per square centimeter.

Further, it is provided for a wall thickness (parallel to the second width direction 36) of the plate 93 to be at least 1 mm.

In the exemplary embodiment shown in FIG. 7(c), the perforated plate 93 is arranged inside the second duct arm 18. A fluid stream can flow past the plate 93 on either side of it. It is also possible for a plurality of corresponding plates arranged in the interior 14 to be provided. In particular, adjacent plate 93 are at a spacing from one another, and fluid can flow through between adjacent plates. In this case, it is in particular provided for each of these plate 93 to be oriented parallel to the second direction of extent 22.

A corresponding plate 93 takes the form for example of a sheet-metal part.

As an alternative or in addition, it may also be provided for the perforated device 90 to comprise one or more open-pore structures. The corresponding pores in the open-pore structure form openings that preferably have the above-mentioned parameters (opening width less than or equal to 1 mm; opening density greater than or equal to 10 openings per square centimeter; wall thickness greater than or equal to 1 mm). The open-pore structure takes the form for example of a block that is correspondingly arranged at the second duct arm 18, in the interior 14. The open-pore structure is for example a foam structure and in particular an absorbent foam structure. If an absorbent foam structure is provided, it is additionally possible for sound absorption (in addition to the "transverse mode canceling") to take place at the perforated device 90.

The open-pore structure may for example also be a fiber material structure such as a nonwoven, a woven material or a knitted material.

Figure 10:
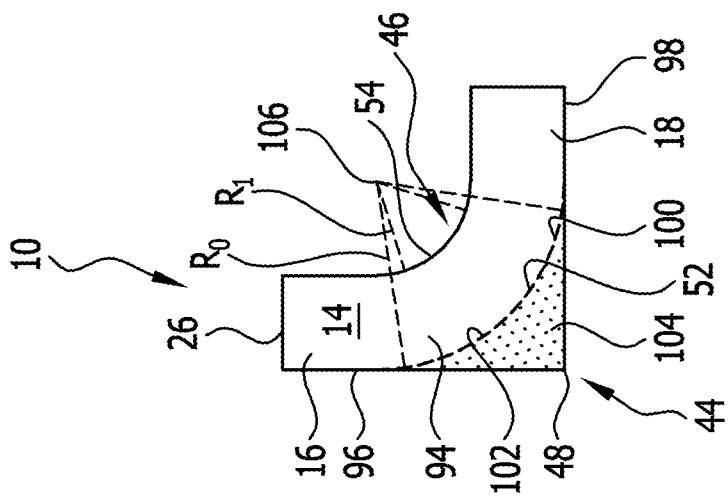
FIG. 10 shows, schematically, an exemplary embodiment of a flow deflection element according to the invention with an insert.

In a third aspect of the solution according to the invention, the built-in wall 52 is provided (see FIG. 10).

Fundamentally, with the flow deflection element 10 it is provided for the first duct arm 16 and the second duct arm 18 to meet in an edge 48 at the external corner region 44, as described above (see FIG. 9(*a*)). This produces effective sound attenuation.

Figure 9:
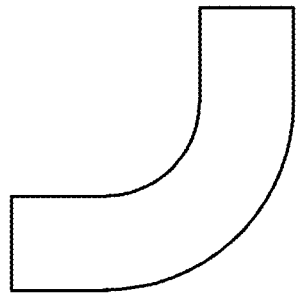
FIG. 9(a) shows, schematically, an exemplary embodiment of a flow deflection element with an edge.
FIG. 9(b) shows, schematically, an exemplary embodiment of a flow deflection element with no edges.
Figure 9:
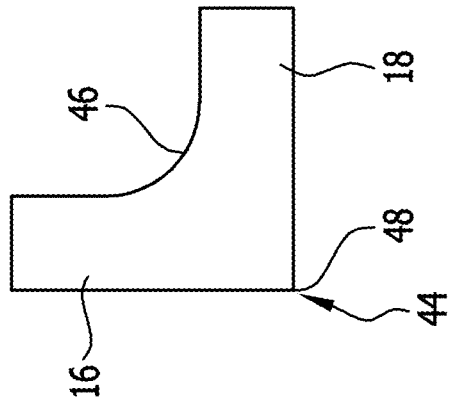

For flow guidance, it is favorable if a "smooth" wall along which the flow is guided and which is in particular free of edges is present (see FIG. 9(*b*)).

In the third aspect of the solution according to the invention, it is provided for the first duct arm 16 and the second duct arm 18 to meet at an edge 48 in an external corner region 44, as already described above with reference to the flow deflection element 10 according to FIG. 1.

The built-in wall 52 is arranged in the interior 14. The built-in wall 52 covers the edge 48 in the interior 14.

In one exemplary embodiment, the built-in wall 52 takes a form that is curved toward a through-flow region 94 located in the interior 14 (and that is concave toward the through-flow region 94).

The built-in wall 52 approaches a corresponding wall 96 of the first duct arm 16 and a corresponding wall 98 of the second duct arm 18 smoothly and in particular in a manner that is free of edges.

The built-in wall 52 merges tangentially into the wall 96 and the wall 98; where the line of merging is described by a corresponding curve, this curve is continuously differentiable at the transition.

The air stream that is guided through by the corresponding flow deflection element 10 is guided along a side 100 of the built-in wall 52 that is upstream of the edge 48 and faces the through-flow region 94. The stream is thus "kept away" from the edge 48.

The built-in wall 52 takes a form such that it conducts flow and is sound-permeable (at the sound frequencies occurring with the corresponding noise source). The permeability is achieved by perforations (openings).

In one exemplary embodiment, the built-in wall is formed by a wall element 102 that is for example a perforated sheet-metal part. This is then positioned accordingly in the interior 14 of the flow deflection element 10.

The perforations are openings from the through-flow region 94 toward the edge 48.

A width of the corresponding openings is in particular greater than $\lambda/50$, where $\lambda$ is a typical upper sound wavelength that is to undergo sound attenuation.

In an alternative exemplary embodiment, the built-in wall 52 is formed by a porous element 104 and porous foam element. This has openings from the side 100 toward the edge 48, the width thereof being in particular greater than $\lambda/50$.

In one concrete exemplary embodiment, the built-in wall has a constant curvature at the side 100—that is to say it has a circular curvature. A center point 106 of a corresponding circle of curvature is in this case located between the first duct arm 16 and the second duct arm 18.

As described above, it is advantageous if the corresponding transition wall at the internal corner region 46 is likewise curved (curved wall 54). In this case, it may be provided for this curved wall 54 to have a constant curvature $R_1$ (which is in particular greater than half of a hydraulic diameter of the first opening 26 of the first duct arm 16).

In one exemplary embodiment, the center point of the corresponding circle of curvature of the curved wall 54 coincides with the center point 106.

This produces effective flow guidance.

In one concrete exemplary embodiment, the side 100 and an inner side of the curved wall 54 are parallel to one another.

If the first width $H_1$ is greater than the width $H_2$, it may also be provided for the side 100 and the inner side of the curved wall 54 not to be parallel.

The built-in wall 52 extends in the first depth direction 34 and in the second depth direction 38. The circle of curvature is as it were a cylinder of curvature having a cylinder axis parallel to the first depth direction 34 and the second depth direction 38.

In a further exemplary embodiment (see FIG. 11), a built-in wall 52' is provided that does not take a curved form, and runs in a straight line between the first duct arm and the second duct arm. The built-in wall 52' is formed for example by a panel element that is positioned between the first duct arm and the second duct arm, or is implemented by a corresponding prism element, for example made from a foam material or fiber material.

The foam material or fiber material may in addition take the form of an absorbent material, for sound absorption.

A flow deflection element 10 in the case of the third aspect of the solution according to the invention, with the built-in wall 52, 52', produces effective flow guidance at the same time as keeping pressure losses small.

For sound attenuation, the edge 48 in the interior 14 is effective. The disadvantage for flow guidance resulting from the edge 48 to the interior 14 is thus as it were compensated by the built-in wall 52, 52'. Flow guidance during flow through the flow deflection element 10 is improved, moreover with effective sound attenuation.

Three aspects for effective sound attenuation (while minimizing pressure losses during flow guidance) have been discussed above, namely: as a first aspect, an enlarged first width $H_1$ by comparison with the second width $H_2$; as a second aspect, the provision of one or more mode filters for transverse modes at the second duct arm 18; and as a third aspect, the provision of the built-in wall 52, which covers the edge 48 in the interior 14 for flow guidance and at the same time is sound-permeable.

Fundamentally, these aspects are independent of one another, and no disruptive influence of these different configurations on one another has been found. It is thus to be expected that a combination of these aspects produces sound attenuation. It is possible to combine the first aspect with the second aspect, to combine the second aspect with the third aspect, the first aspect with the third aspect, or all three aspects with one another.

Figure 11:
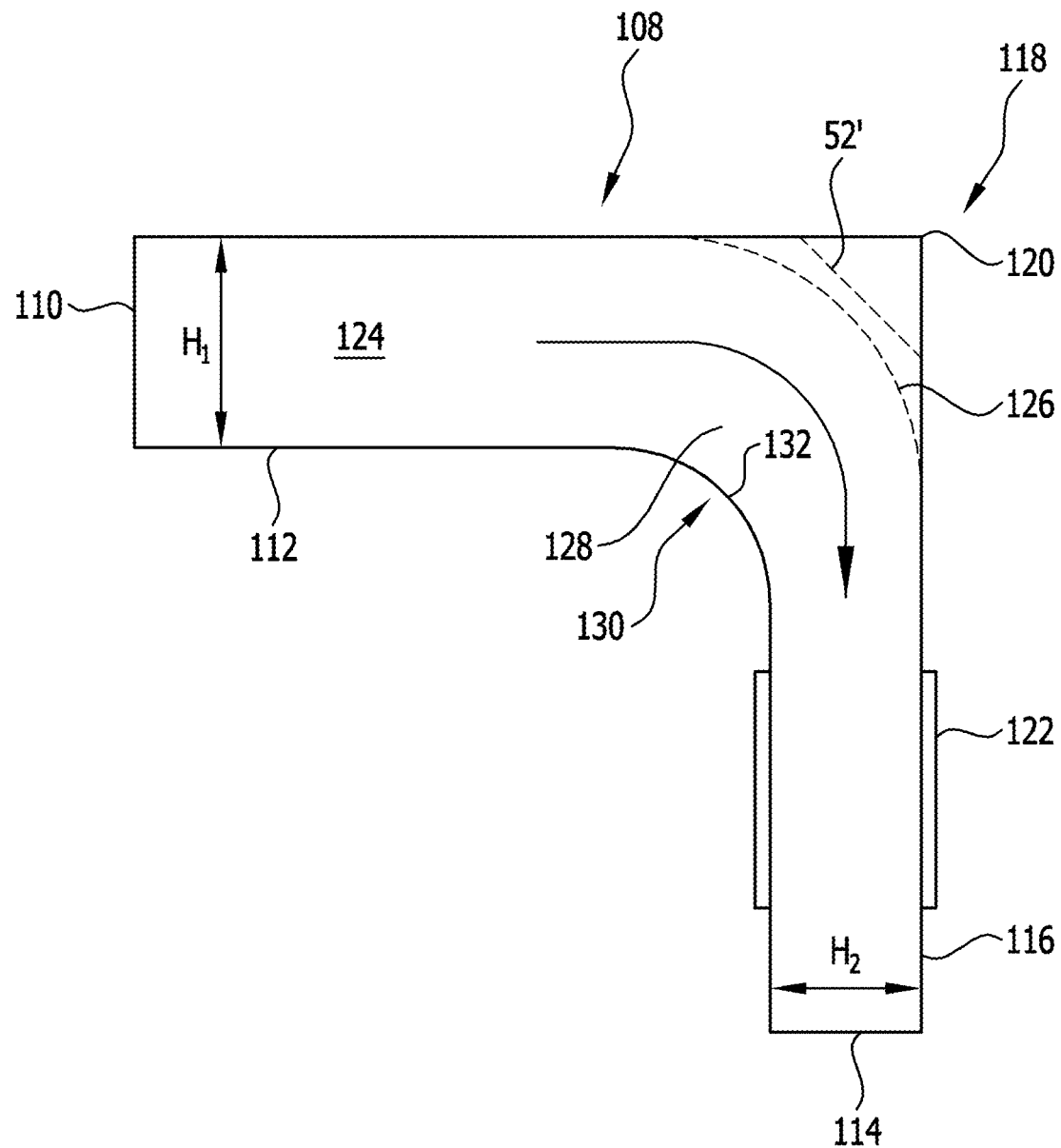
FIG. 11 shows a schematic illustration of a further exemplary embodiment of a flow deflection element according to the invention.

FIG. 11 shows, schematically, a flow deflection element 108 in which all three aspects are implemented.

A width $H_1$ at a first opening 110 of a first duct arm 112 is larger than a width $H_2$ at a second opening 114 of a second duct arm 116. The second duct arm 116 is oriented transversely and in particular perpendicular to the first duct arm 112, wherein an edge 120 is present at an external corner region 118.

Arranged at the second duct arm 116, in particular at a spacing from the first duct arm 112, is a mode filter 122 for transverse modes (first transverse modes, second transverse modes, etc.).

Arranged in an interior 124 of the flow deflection element 108 is a curved built-in wall 126, which covers the edge 120 in the interior 124 toward a through-flow region 128, and in so doing guides flow. The built-in wall 126 is sound-permeable, resulting in effective sound attenuation.

A corresponding transition wall 132 takes a curved form at an internal corner region 130 (in particular having an internal radius that is greater than half of a hydraulic diameter of the first opening 110).

Fundamentally, it may also be provided for the flow deflection element 108 to take a "flat" form, as described above, wherein the widths $H_1$, $H_2$ are larger than depths perpendicular thereto (see WO 2018/068850 A1).

In respect of the said aspects of the invention, reference is made explicitly and in its entirety to the dissertation by Dominik Scholl for which the details are given above.

A flat form of the flow deflection element may be advantageous for flow efficiency and also for broad band transmission losses.

In FIGS. 12 to 47 are exemplary embodiments of cleaning apparatus having a (at least one) corresponding flow deflection element, in which one or more of the above-mentioned aspects according to the invention are implemented, shown.

One exemplary embodiment of a cleaning apparatus is a suction device 134 (FIGS. 12 to 15). The suction device 134 is for example a stand-alone vacuum cleaner. This vacuum cleaner comprises a fan 136 that generates a suction stream. This suction stream acts on a suction hose 138. A filter device 140 is provided, through which there is flow as a result of operation of the suction stream of the cleaning apparatus 134.

Connected to the fan 136 is an air guidance device 142. Process air is guided away in this air guidance device 142. This process air is the exhaust air from the fan 136. This is air cleaned by the filter device 140.

This air guidance device 142 has a flow deflection element 10 as described above. In the schematic exemplary embodiment according to FIG. 12, the air guidance device 142 is formed by a flow deflection element of this kind, wherein the first opening 26 is connected directly to an outlet of the fan 136, and the second opening 28 opens to the exterior.

The air guidance device 142 may also comprise a flow deflection element 10 of this kind as a constituent part.

The fan 136 itself, which generates the corresponding air stream in the air guidance device 142, is in this case also the sound-emitting noise source.

The flow deflection element 10 of the air guidance device 142 ensures corresponding sound attenuation, wherein the pressure loss during flow guidance is minimized as described above.

Figure 12:
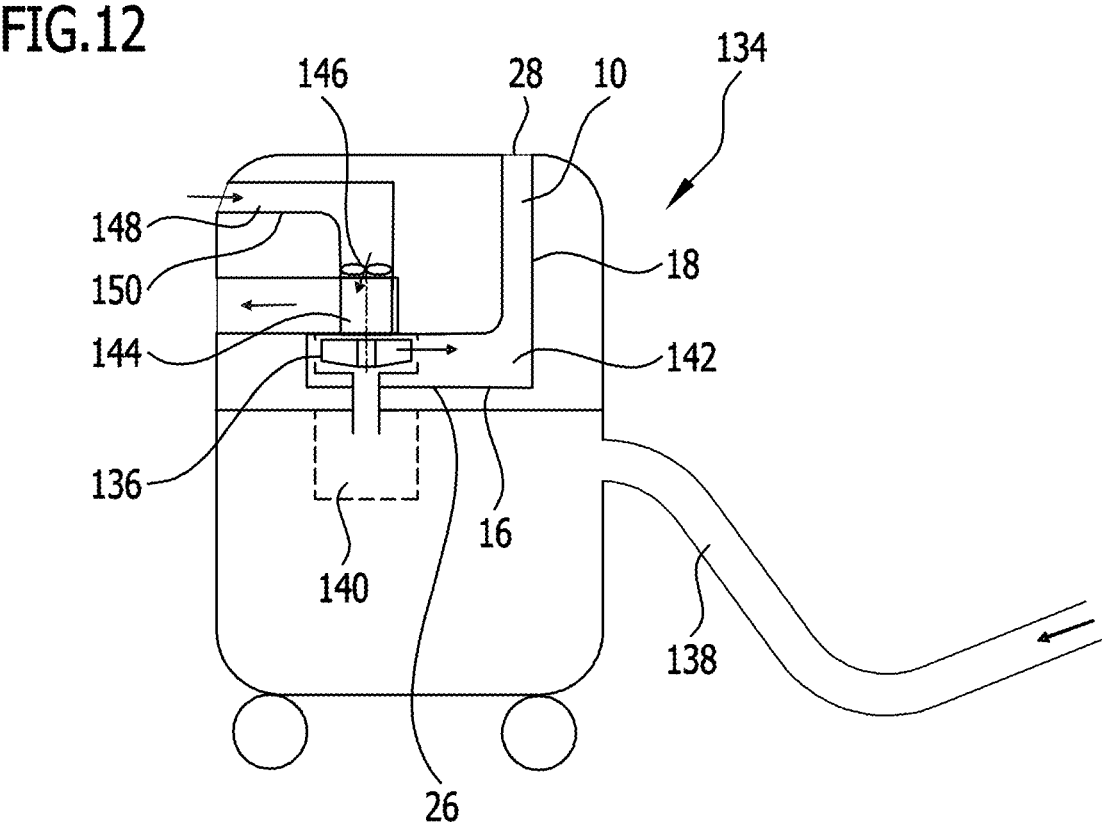

FIG. 12 shows, schematically, a flow deflection element 10 in which the ratio of the first width $H_1$ at the first opening 26 to the second width $H_2$ at the second opening 28 is greater than 1.

The fan 136 comprises a fan motor 144 with which a cooling fan 146 is associated. The cooling fan serves to cool the fan motor 144, in particular using air; the fan motor 144 is air-cooled.

For this purpose, a corresponding air guidance device 148 is provided, which may likewise be provided with a flow deflection element 150. The direction of sound propagation there is the opposite to the direction of the flow throughput.

Figure 13:
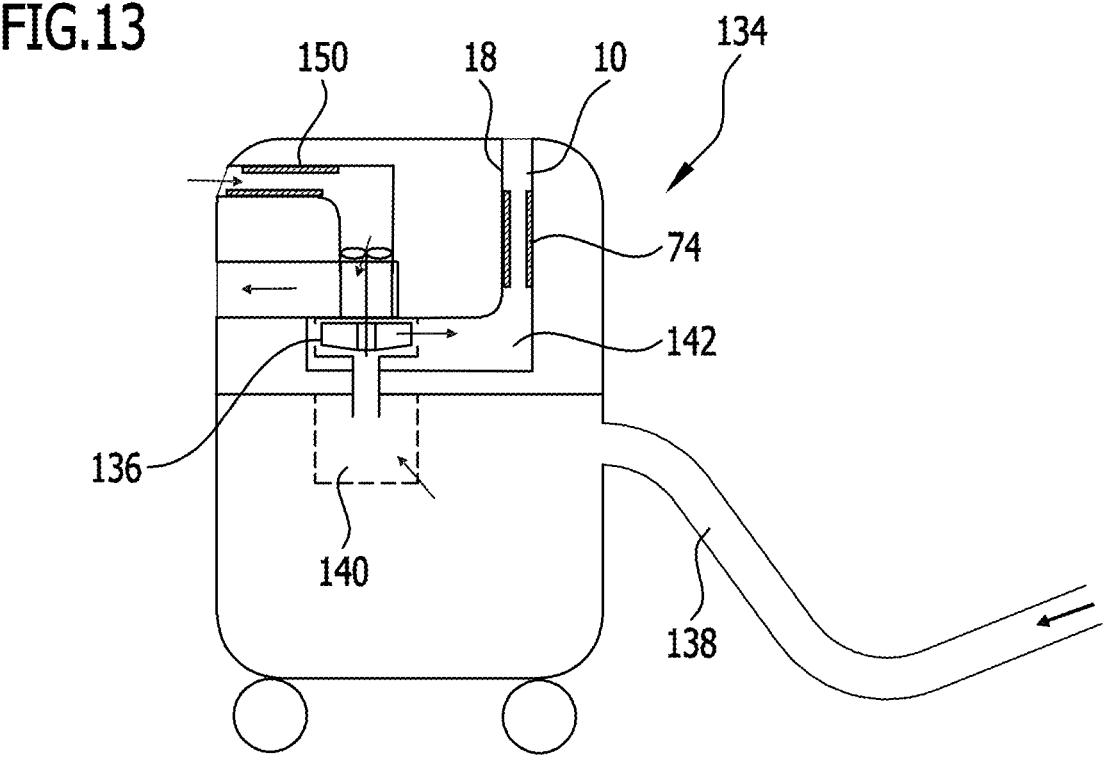

A mode filter 74 may for example be arranged at the second duct arm 18 of the flow deflection element 10 and/or 150 (FIGS. 13, 14).

It is for example also possible for the flow deflection element 10 to be provided with a built-in wall 52.

The flow deflection element 150 may also be provided with a mode filter for transverse modes at a flow arm that is an input arm.

FIGS. 16 to 19 show, schematically, as an exemplary embodiment of a cleaning apparatus, a high-pressure cleaner 152. This comprises a motor 154 as the noise source. The motor 154 is air-cooled, and an air guidance device 156 is provided.

Figure 16:
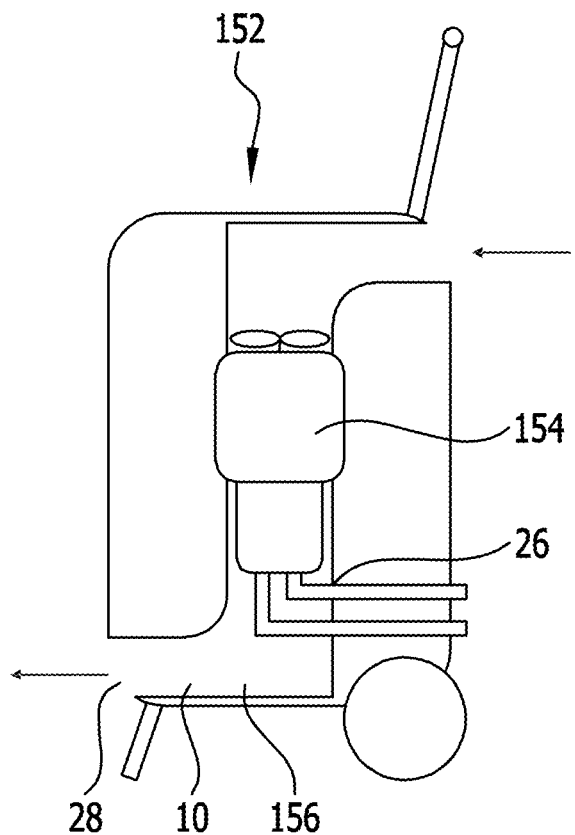
FIGS. 16 to 19 show, schematically, an exemplary embodiment of a high-pressure cleaning device with different flow deflection elements according to the invention.
Figure 17:
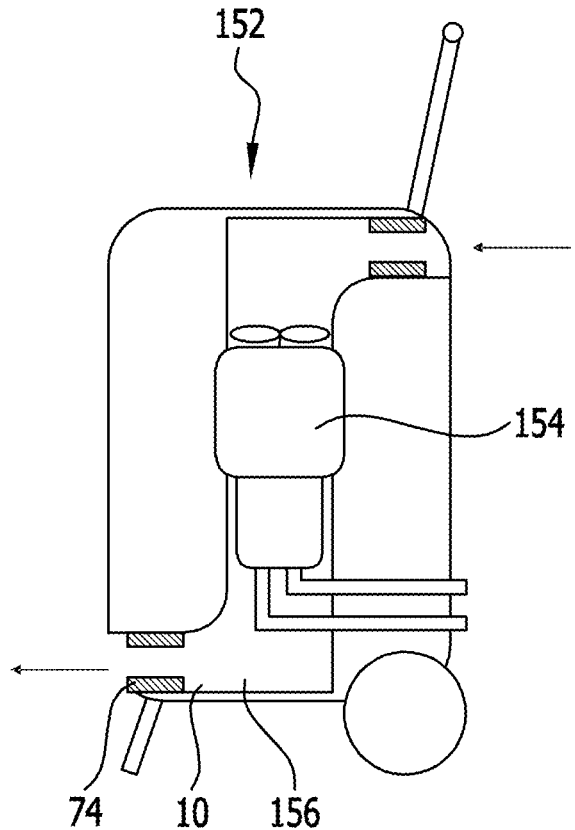
Figure 18:
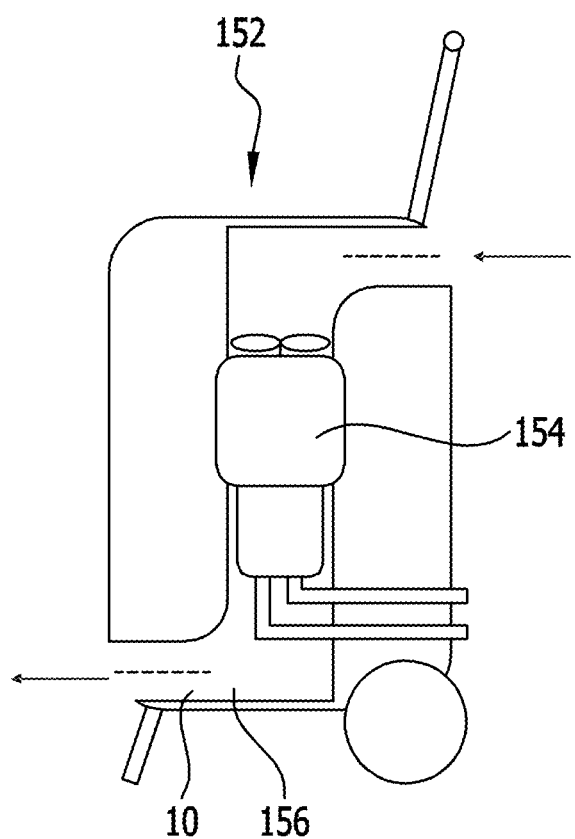
Figure 19:
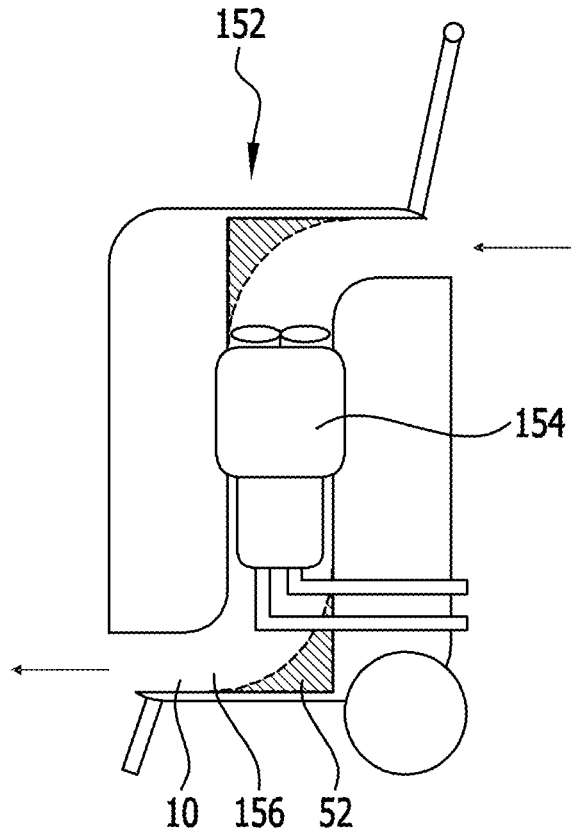

The air guidance device 156 comprises in particular a flow deflection element 10, of which the input side is downstream of the motor 154 and the output side leads to the exterior. The flow deflection element 10 may take a form as described above, and have for example a greater width at a first opening 26 than at a second opening 28 (FIG. 16). It may be provided with a mode filter 74 (FIGS. 17, 18). It may be provided with a built-in wall 52 (FIG. 19).

A further exemplary embodiment of a cleaning apparatus is a wet-floor cleaner 158, which is in particular hand-held and/or manually guided (FIGS. 20 to 23). In particular, a user in a standing position can guide this wet-floor cleaner 158 over a floor that is to be cleaned.

The wet-floor cleaner 158 comprises at least one cleaning roller 160, which is in particular a textile roller. Cleaning liquid is supplied to the at least one cleaning roller.

A fan 162, which is a suction fan, is provided. Fluid from the cleaning roller 160 can be removed by suction by way of this fan. The fluid is cleaning liquid carrying dirt particles.

A corresponding dirt-collection container 164 is provided, with an associated and for example integrated separator.

The fan 162 comprises a fan motor 166 as the noise source. This is air-cooled. An air guidance device 168 which comprises a flow deflection element 10 according to the invention is provided.

In the exemplary embodiment shown, the flow deflection element 10 itself forms the air guidance device 168.

Figure 20:
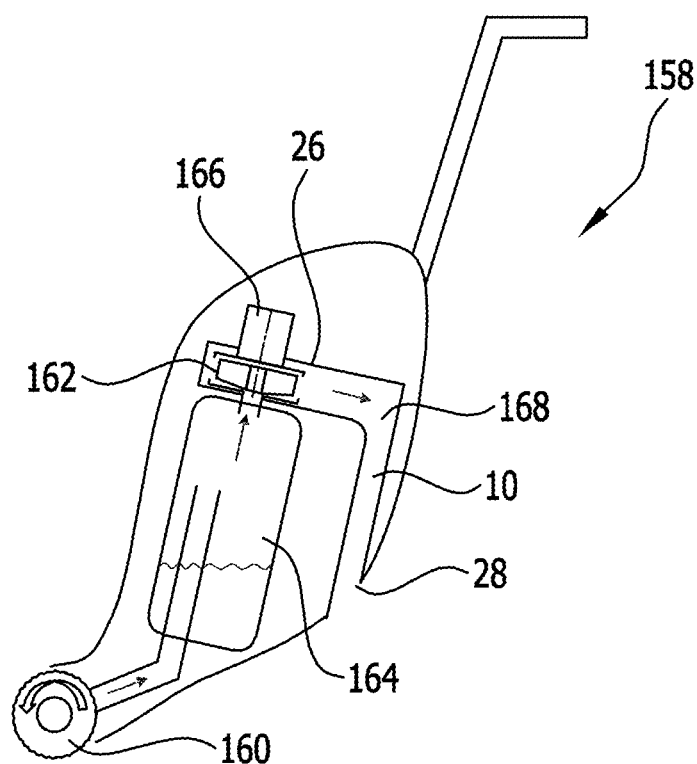
FIGS. 20 to 23 show, schematically, an exemplary embodiment of a (wet) floor cleaning device that is manually guided, with different embodiments of a flow deflection element according to the invention.
Figure 21:
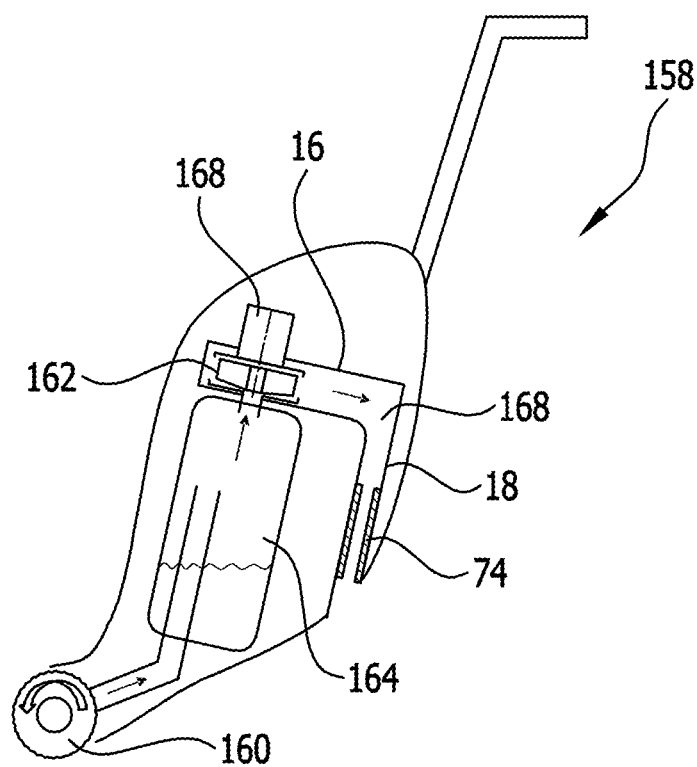
Figure 22:
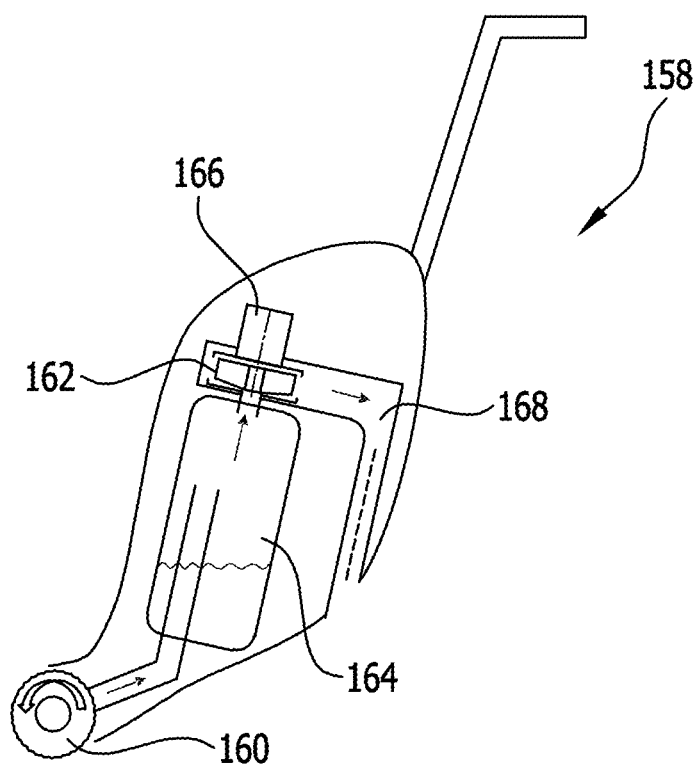
Figure 23:
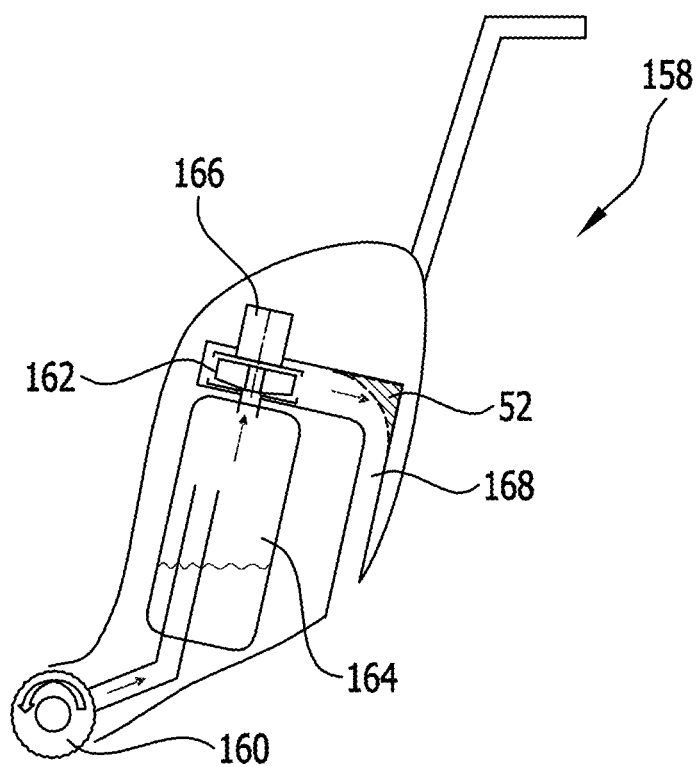
Figure 24:
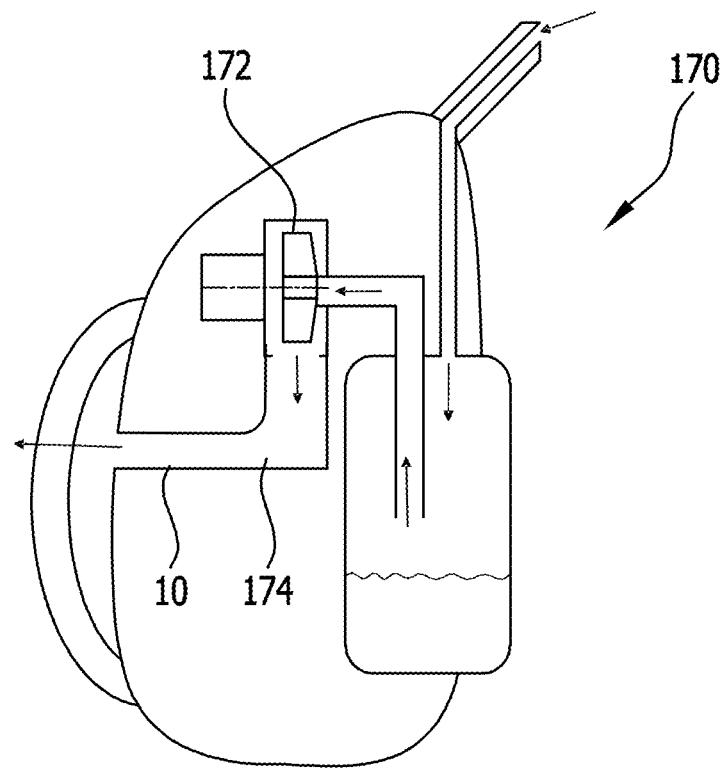
FIGS. 24 to 27 show, schematically, an exemplary embodiment of a window vacuum cleaner with different embodiments of flow deflection elements according to the invention.
Figure 25:
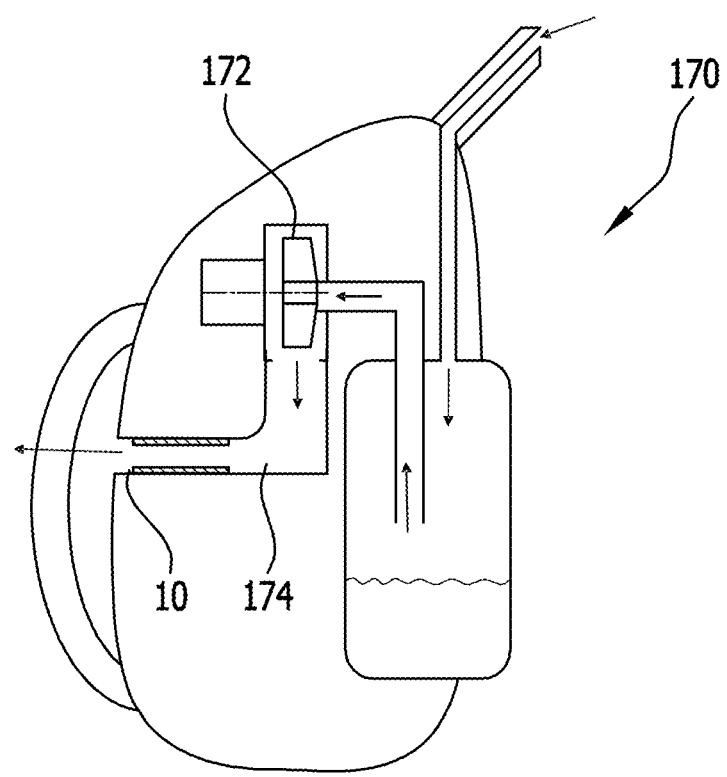
Figure 26:
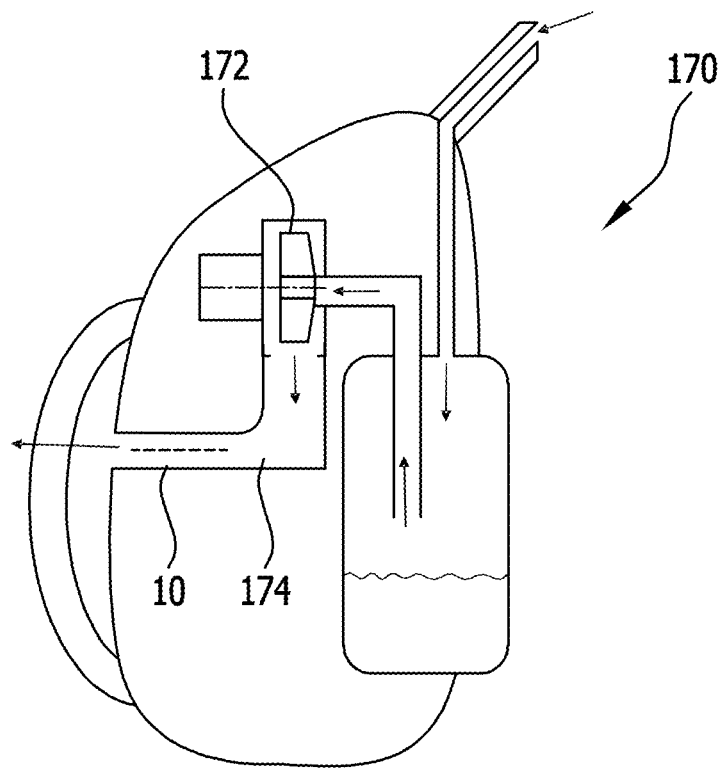
Figure 27:
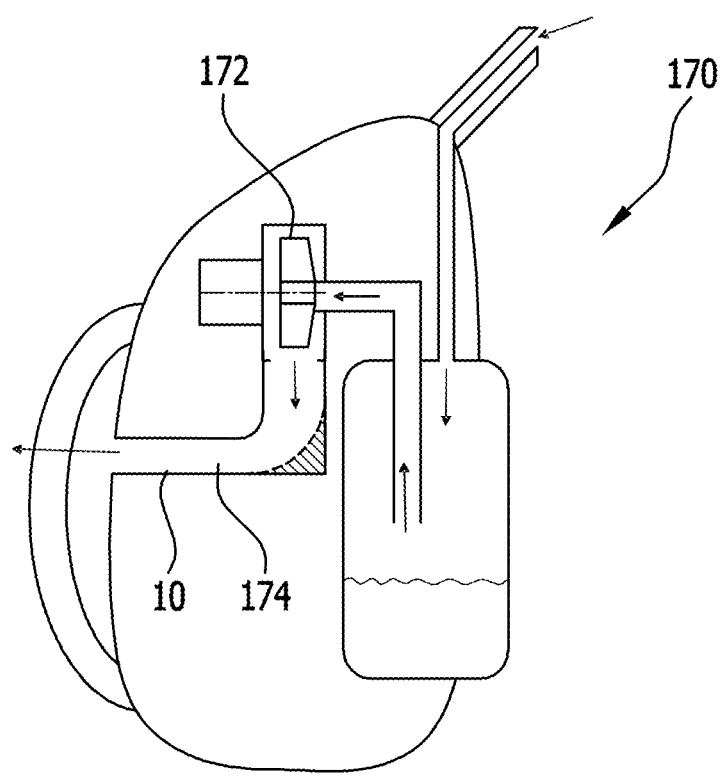
Figure 28:
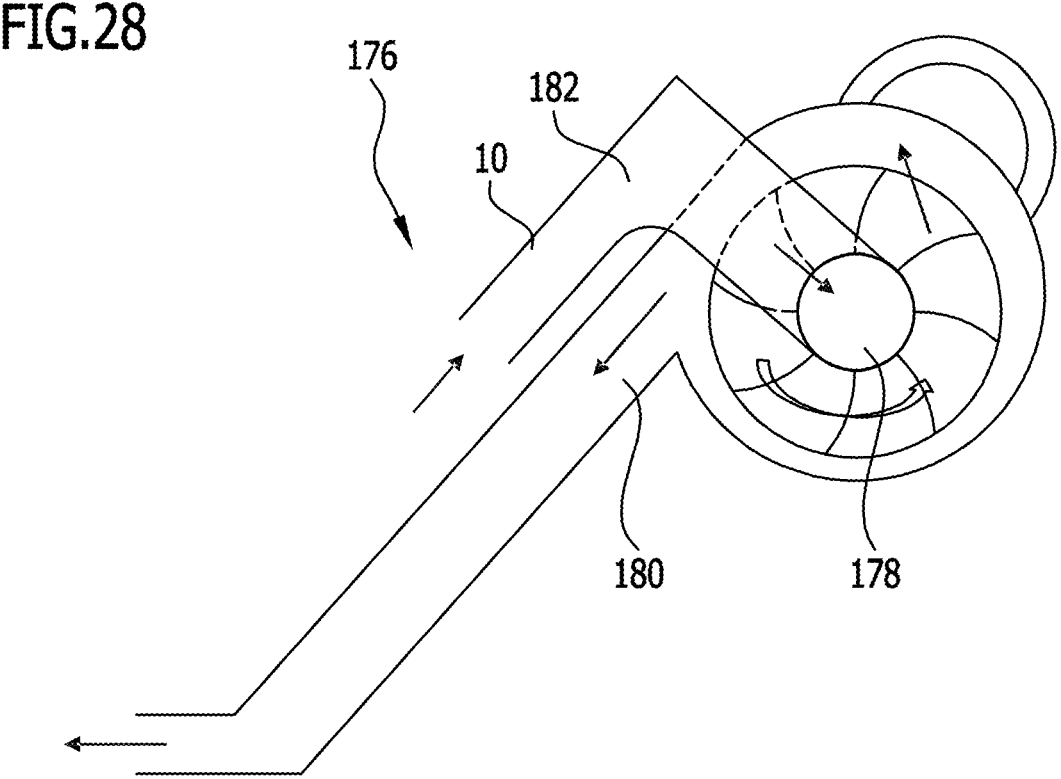
FIGS. 28 to 31 show an exemplary embodiment of a leaf blower with different embodiments of flow deflection elements according to the invention.
Figure 29:
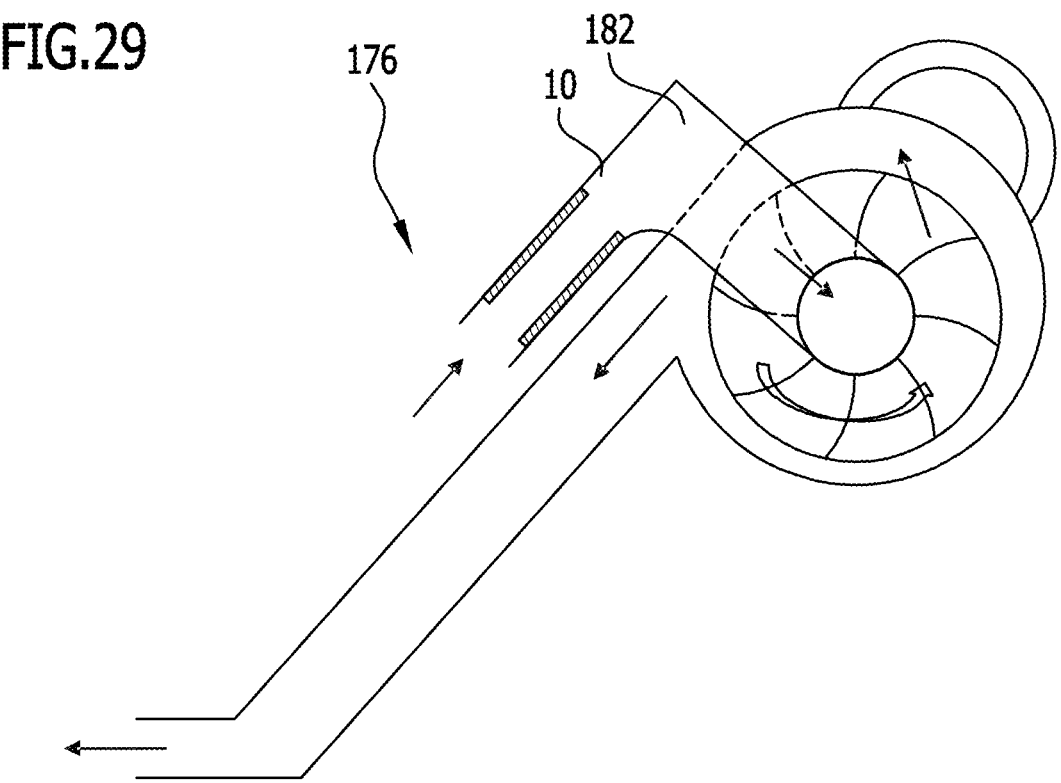
Figure 30:
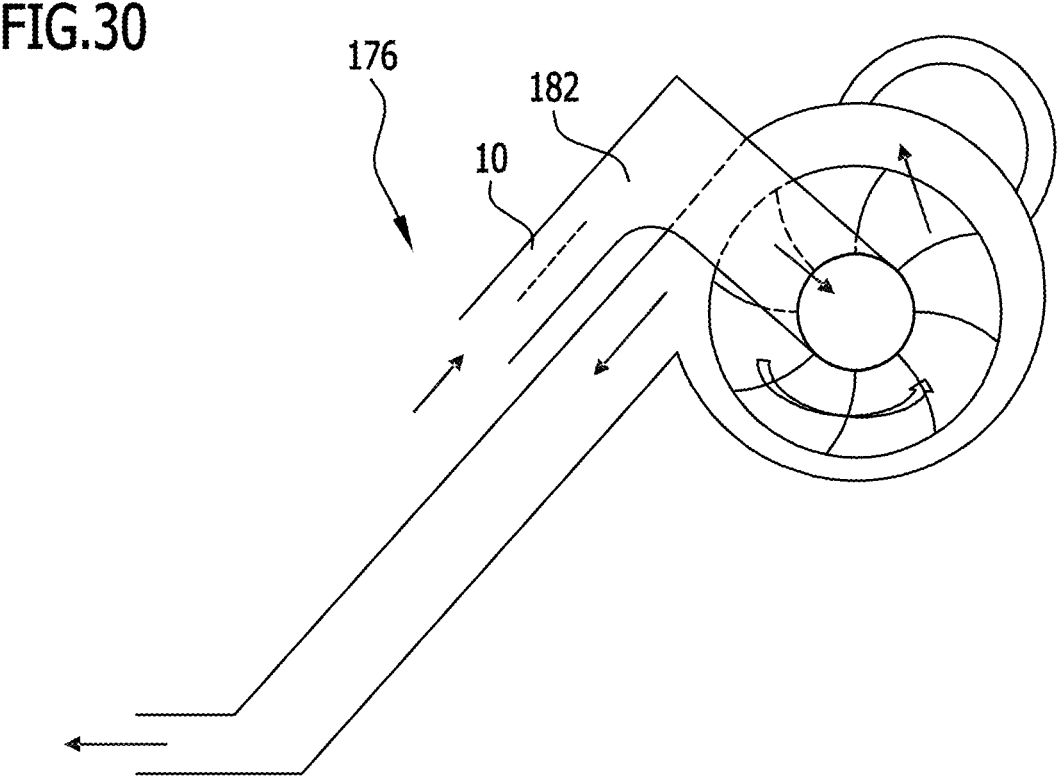
Figure 31:
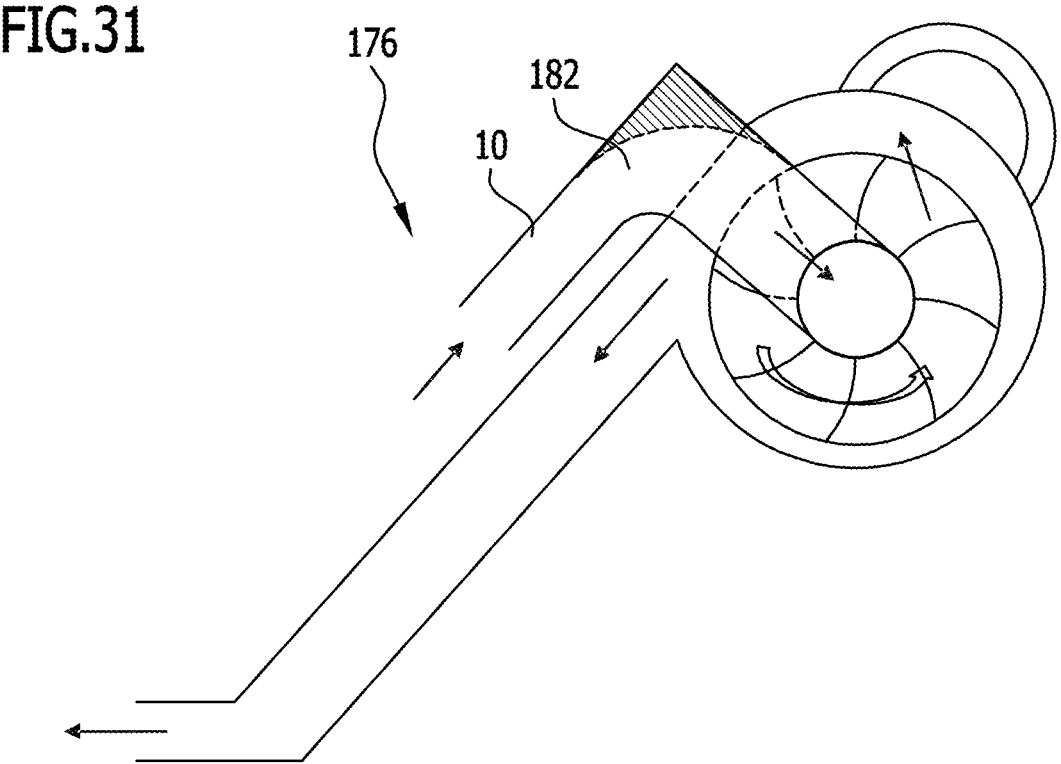
Figure 34:
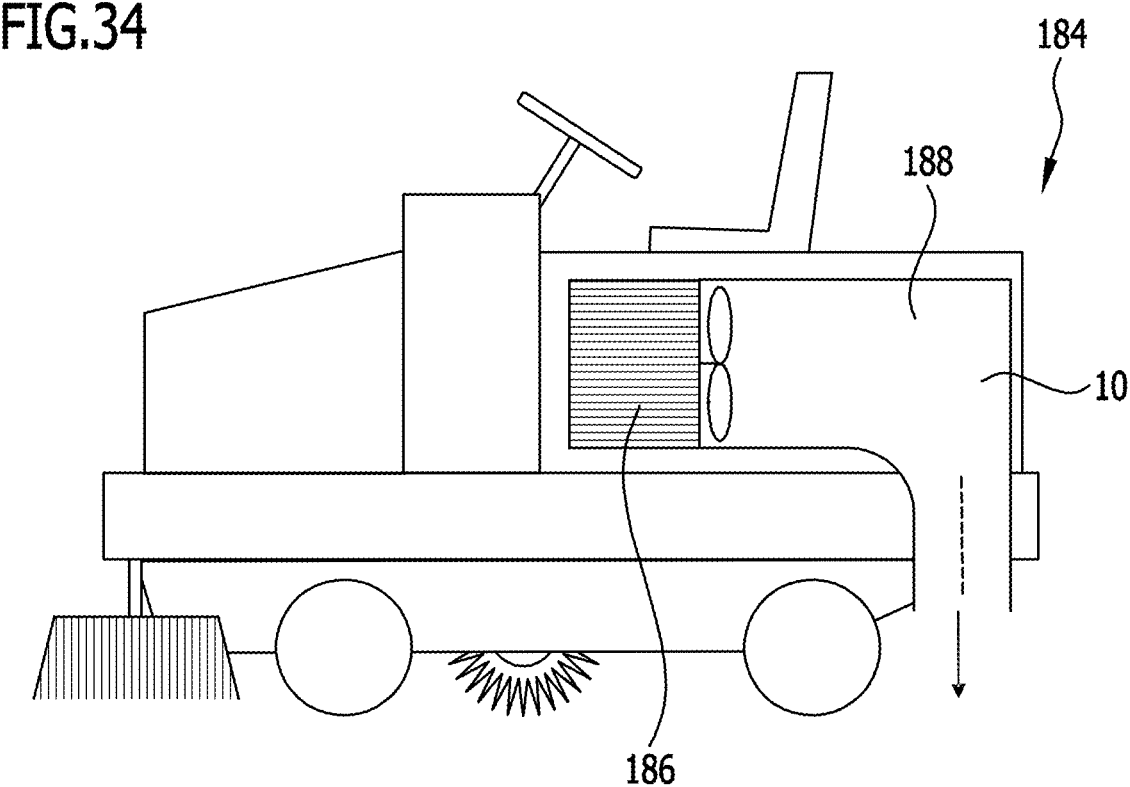
FIGS. 32 to 35 show, schematically, an exemplary embodiment of a sit-on sweeper with different embodiments of flow deflection elements according to the invention.
Figure 32:
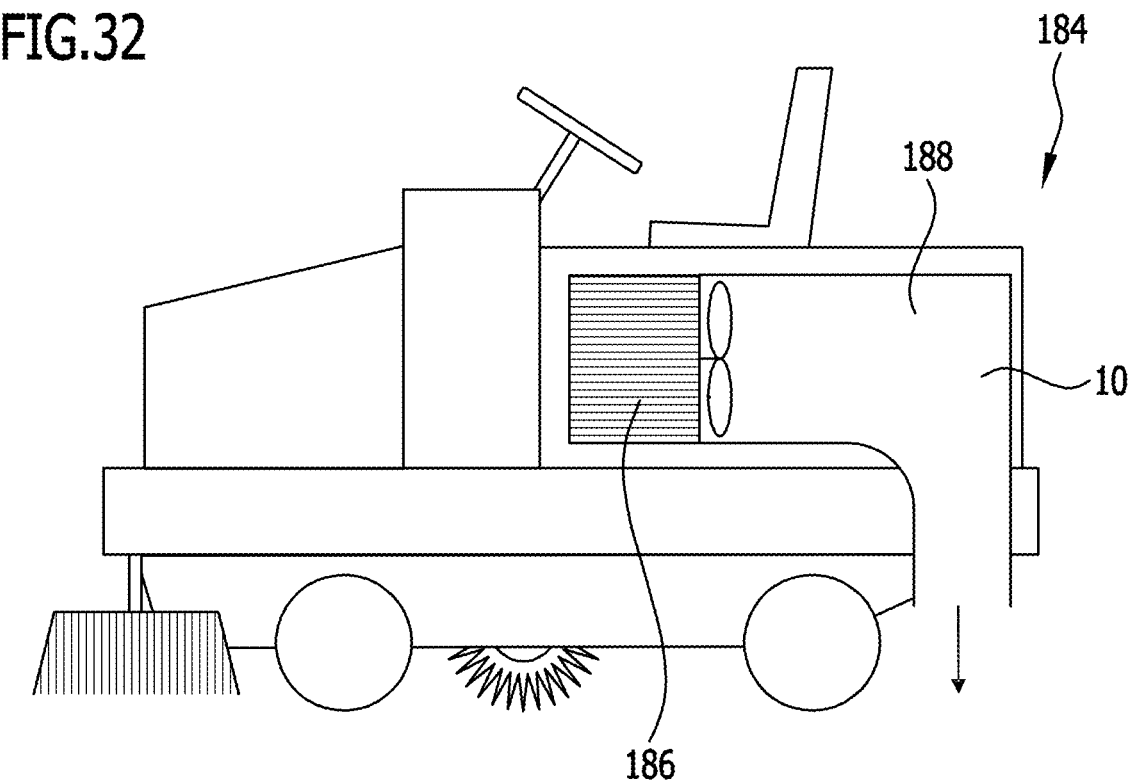

In that case, it may in particular be provided for a first width of the flow deflection element 10 to be larger at the input side than an opening 28 on the output side (FIG. 20). A mode filter 74 may be provided at the corresponding second duct arm 18 (FIGS. 21, 22).

A built-in wall 52 may be arranged at the flow deflection element.

A further exemplary embodiment of a cleaning apparatus according to the invention is a window vacuum cleaner 170 (FIGS. 24 to 27).

This window vacuum cleaner comprises a fan 172 in the form of a suction fan.

Exhaust air is guided away from the fan in an air guidance device 174. The fan 172 (having a fan and/or a corresponding impeller) is a noise source.

The air guidance device 174 comprises a flow deflection element 10 on which at least one of the aspects according to the invention (ratio of the first width to the second width; mode filter for transverse modes at the second duct arm; built-in wall) is implemented.

A further exemplary embodiment of a cleaning apparatus according to the invention is a leaf blower 176 (FIGS. 28 to 31).

This leaf blower comprises a fan 178 that generates a blown stream 180. Air (for generating the blown stream 180) is supplied to the fan 178 by way of an air guidance device 182.

The air guidance device 182 is or comprises a flow deflection element 10 which takes a form corresponding to at least one of the above-mentioned aspects.

A further exemplary embodiment of a cleaning apparatus according to the invention is a sweeper 184, which is schematically shown in FIGS. 32 to 35 in the form of a sit-on sweeper. This sweeper 184 comprises a fan 186 as the noise source. Connected to the fan 186 is an air guidance device 188 that is or comprises an acoustic angle 10 according to the invention.

Figure 35:
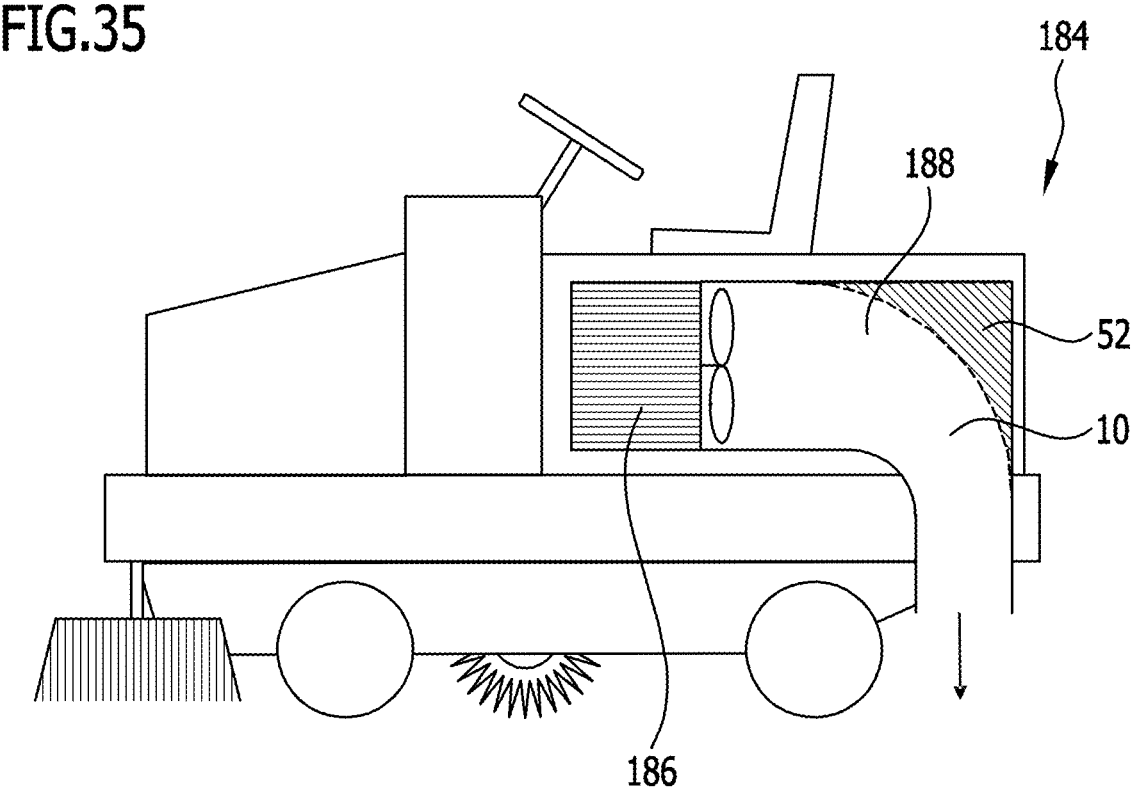
Figure 33:
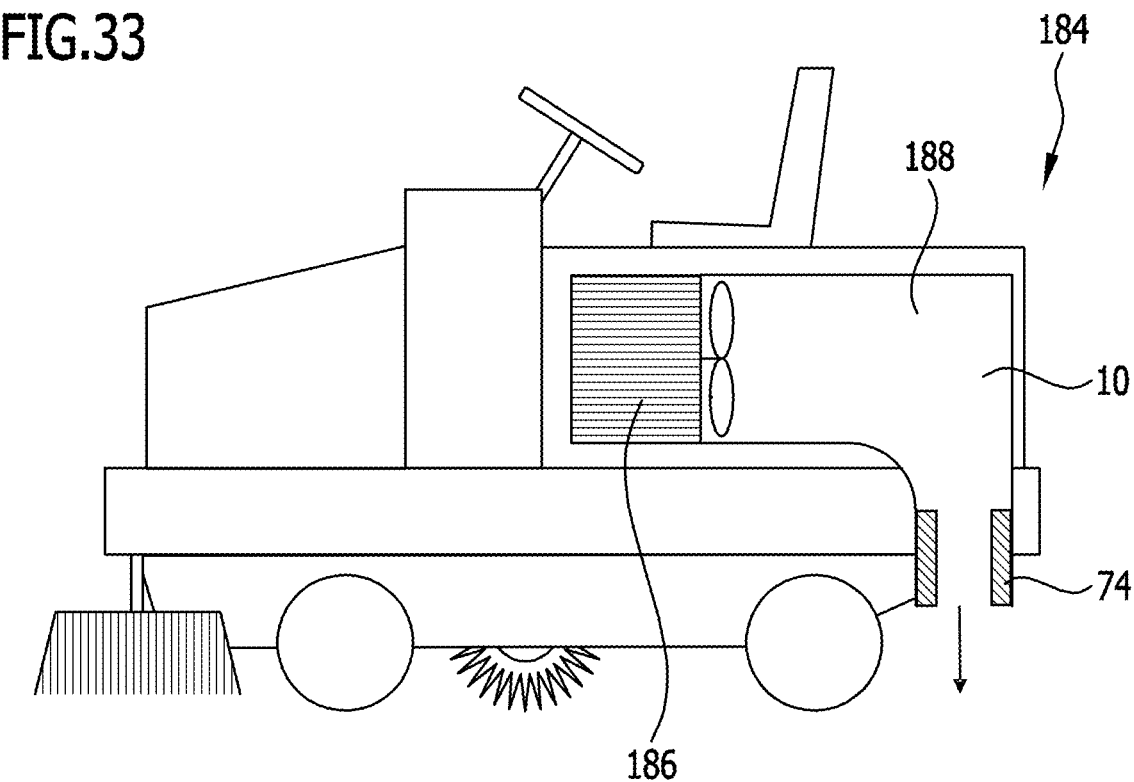
Figure 36:
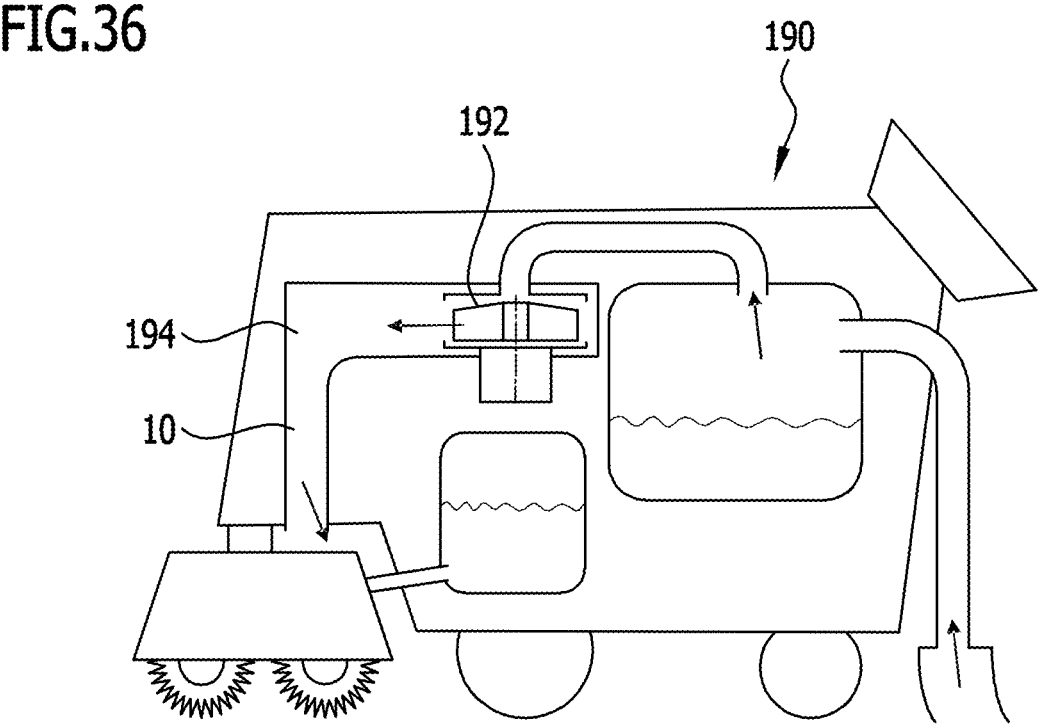
FIGS. 36 to 39 show, schematically, an exemplary embodiment of a walk-behind swabbing machine with different embodiments of flow deflection elements according to the invention.
Figure 37:
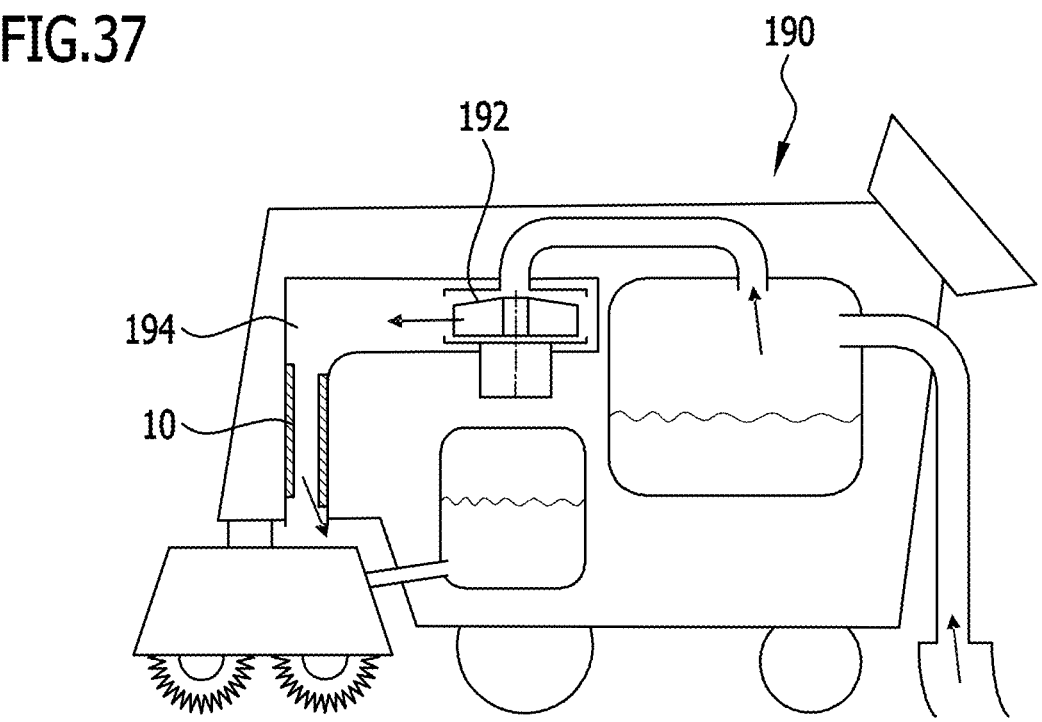
Figure 38:
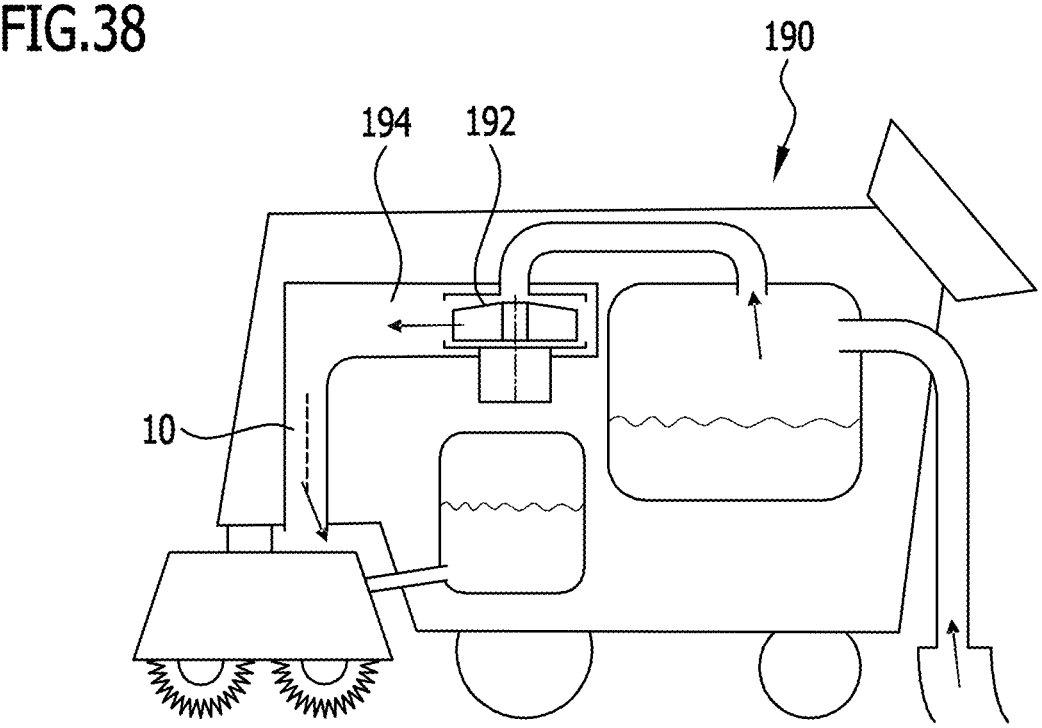
Figure 39:
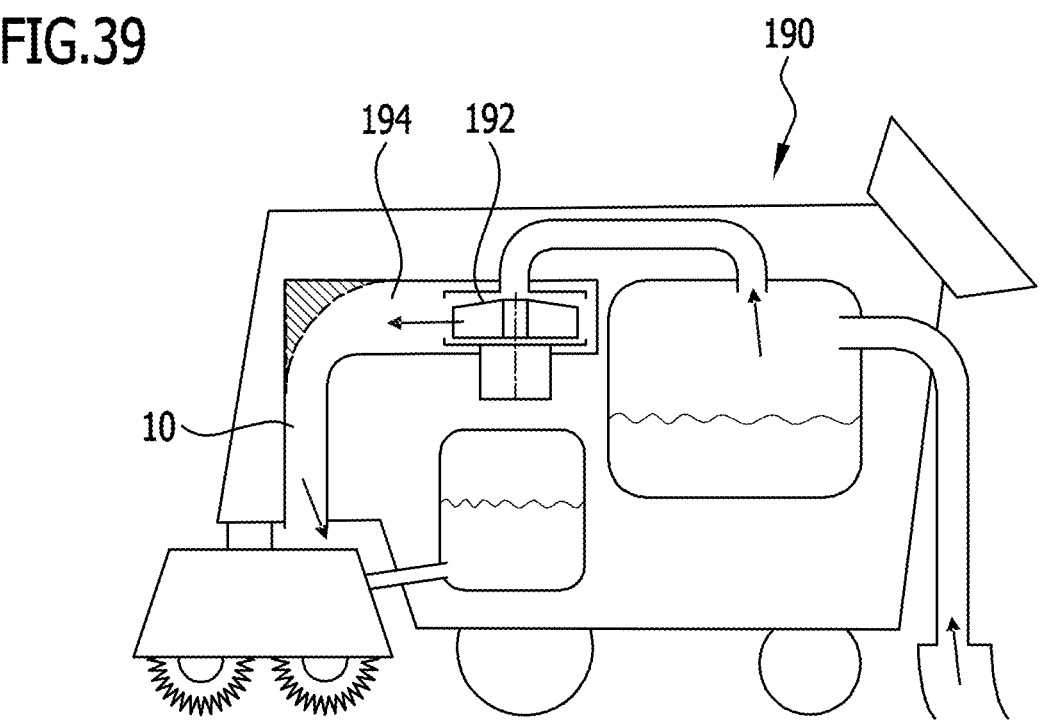
Figure 40:
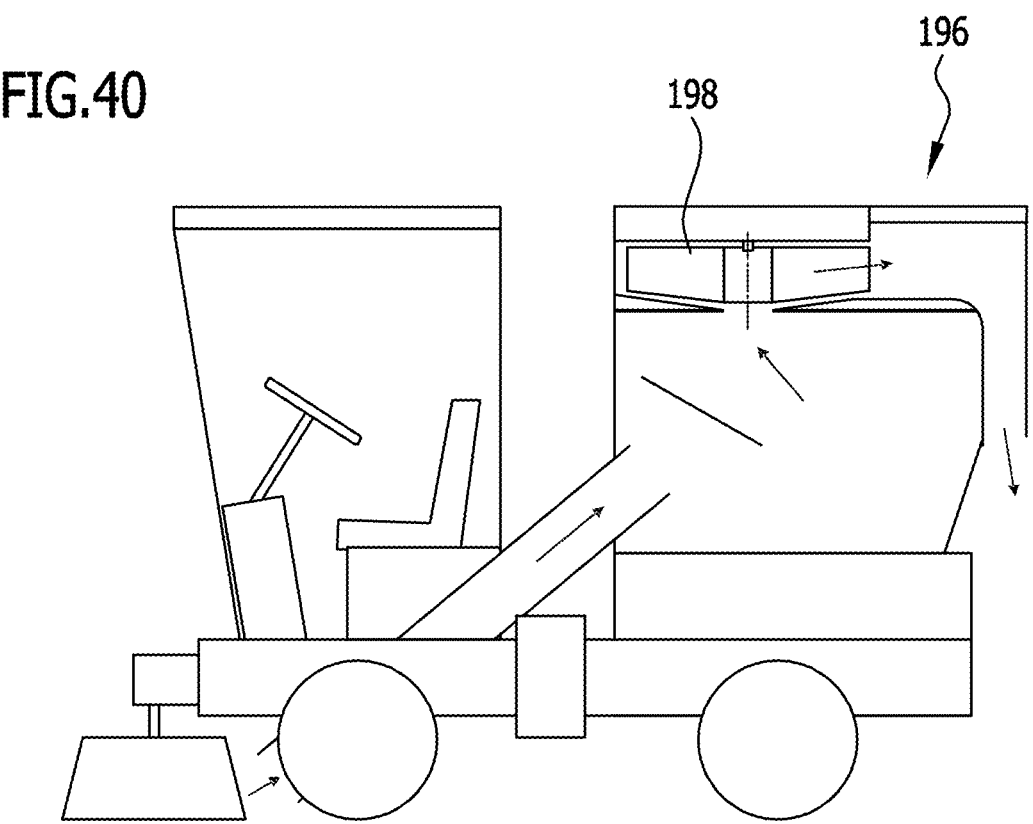
FIGS. 40 to 43 show, schematically, an exemplary embodiment of a municipal vehicle with different embodiments of flow deflection elements according to the invention.
Figure 41:
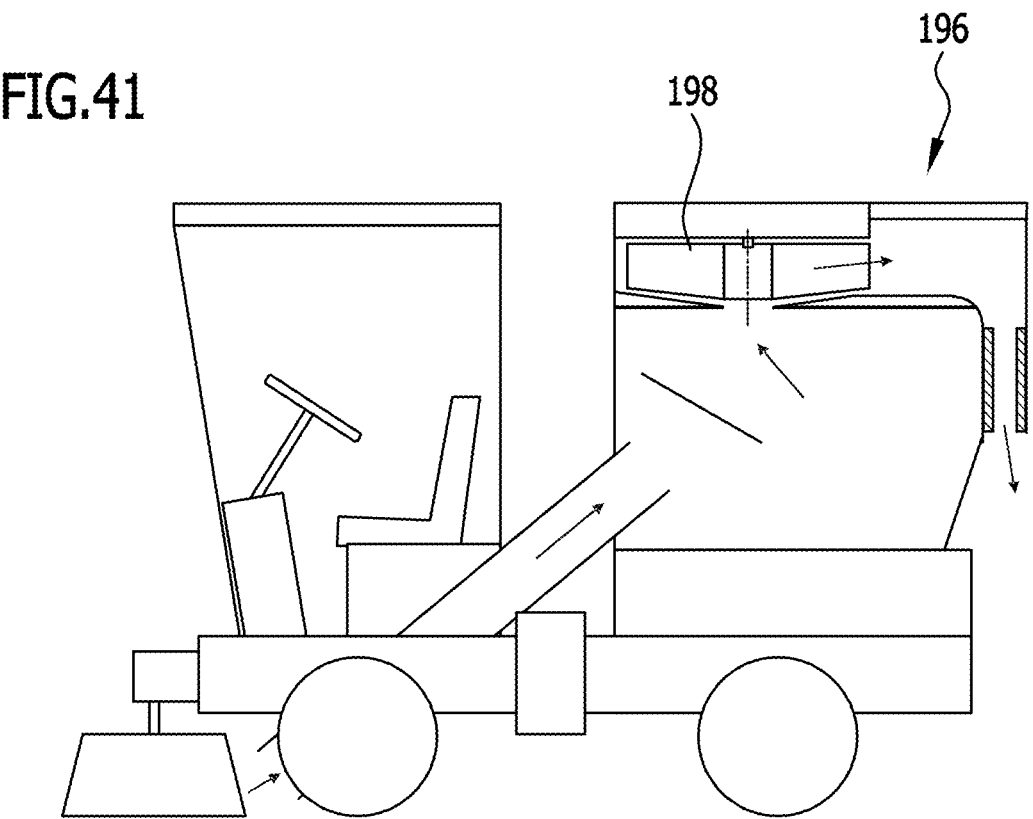
Figure 42:
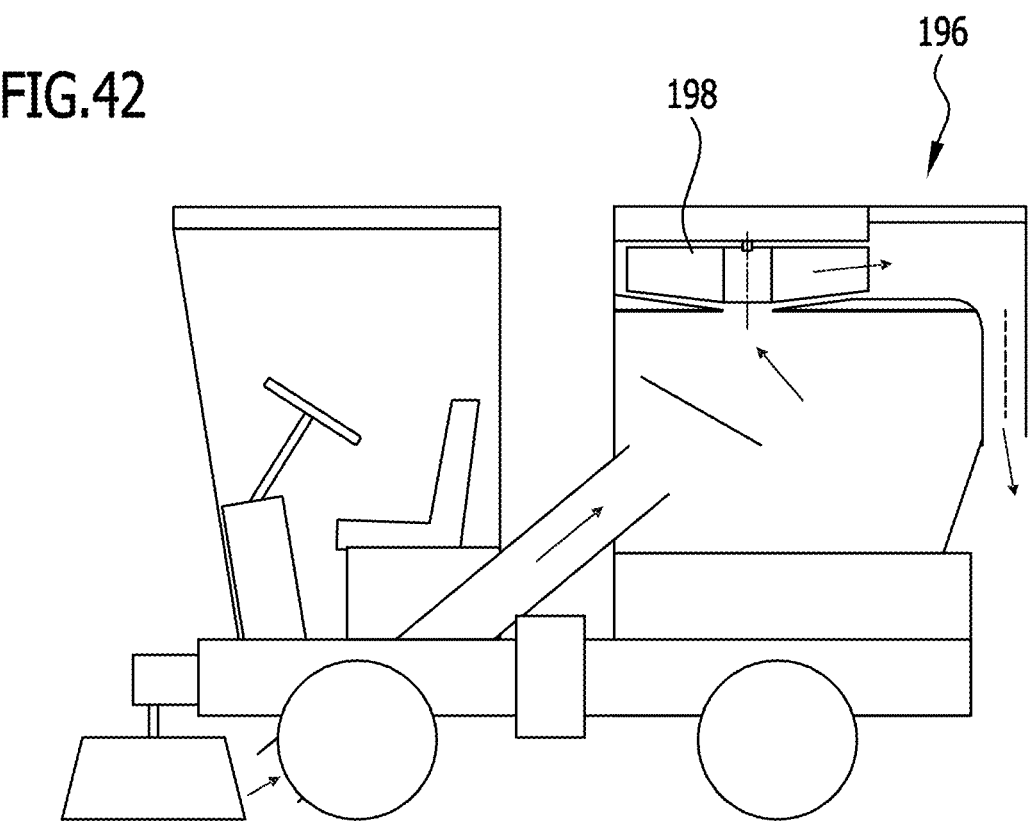
Figure 43:
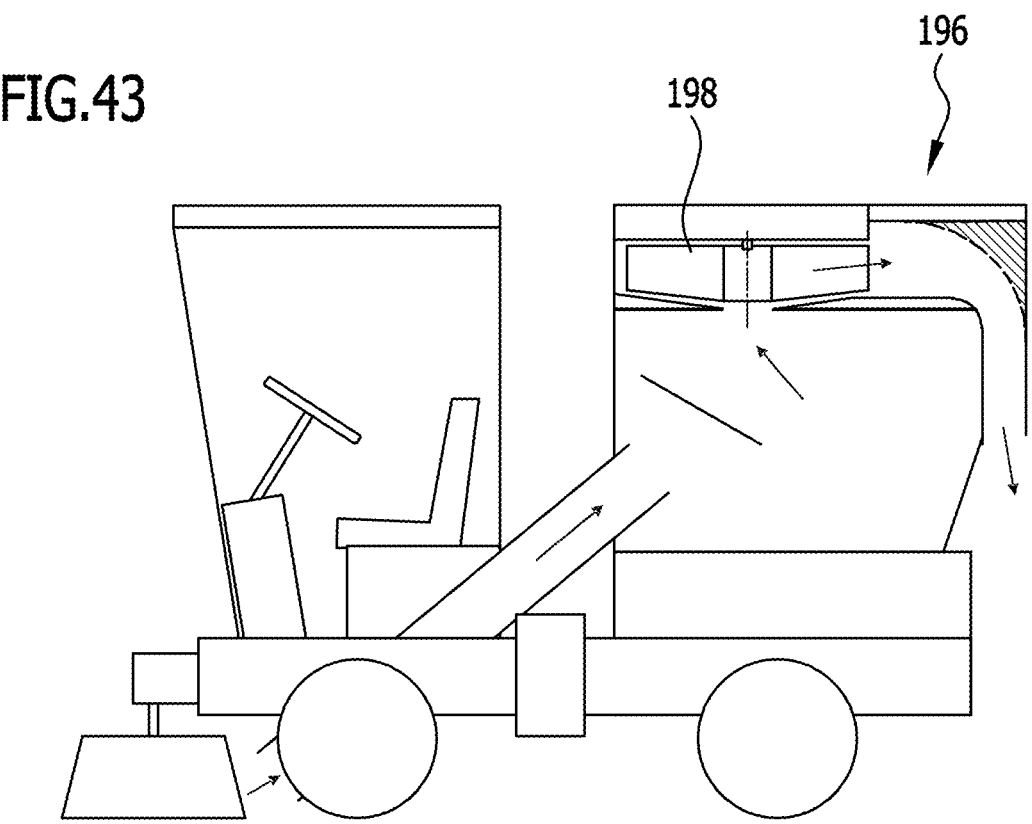
Figure 44:
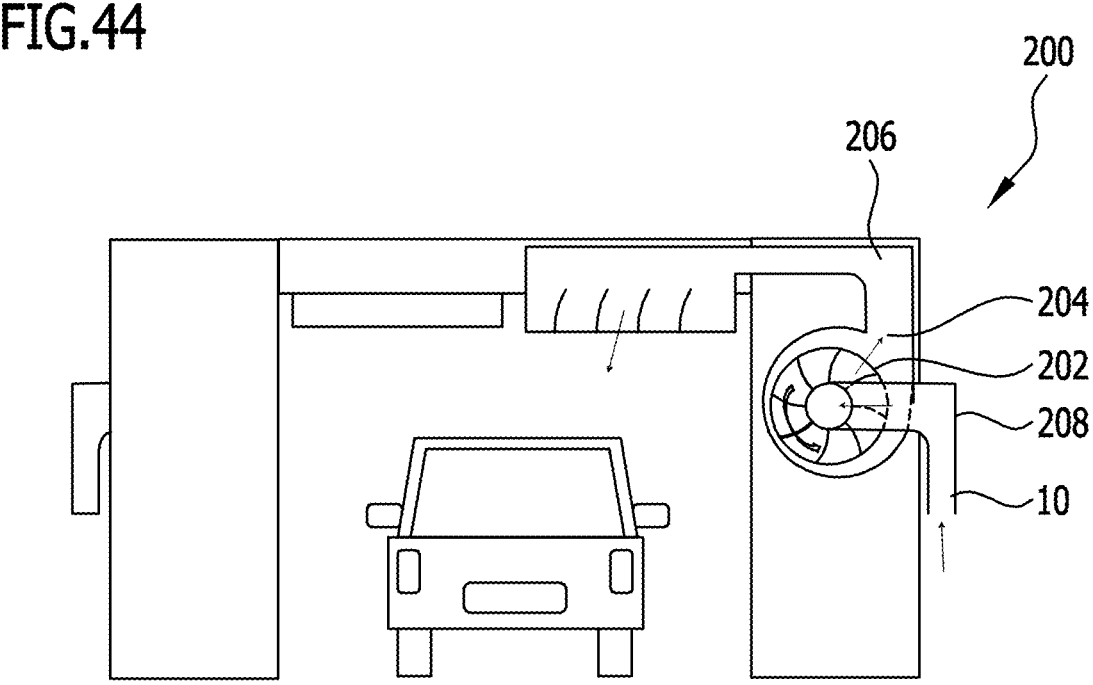
FIGS. 44 to 47 show an exemplary embodiment of a gantry wash with different embodiments of flow deflection elements according to the invention.
Figure 45:
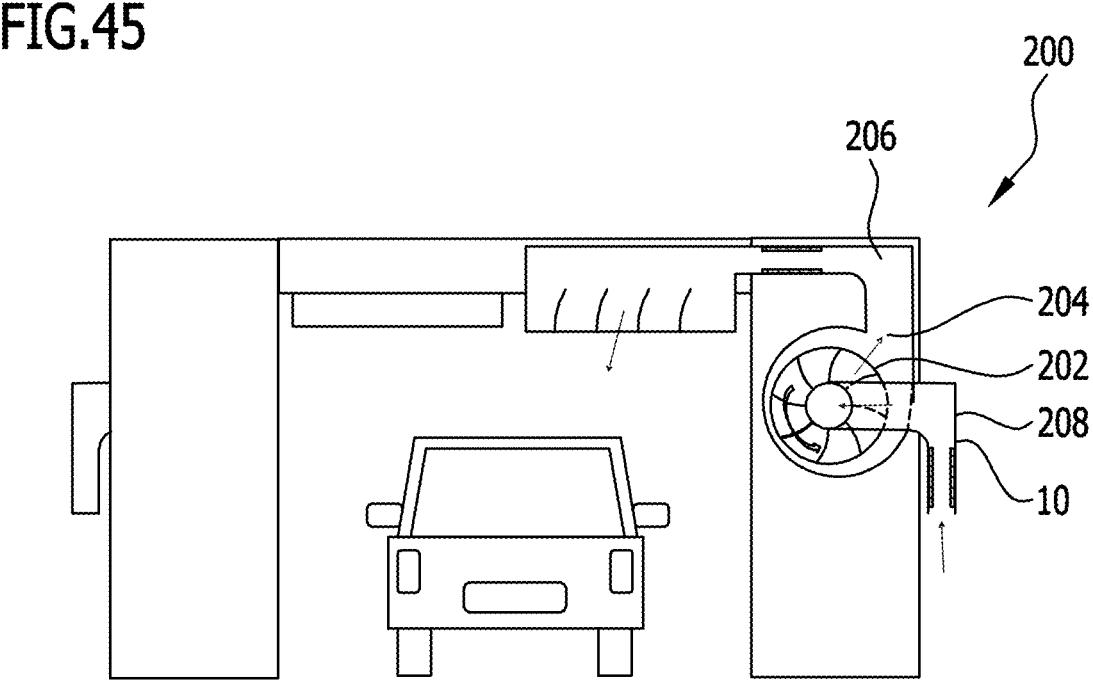
Figure 46:
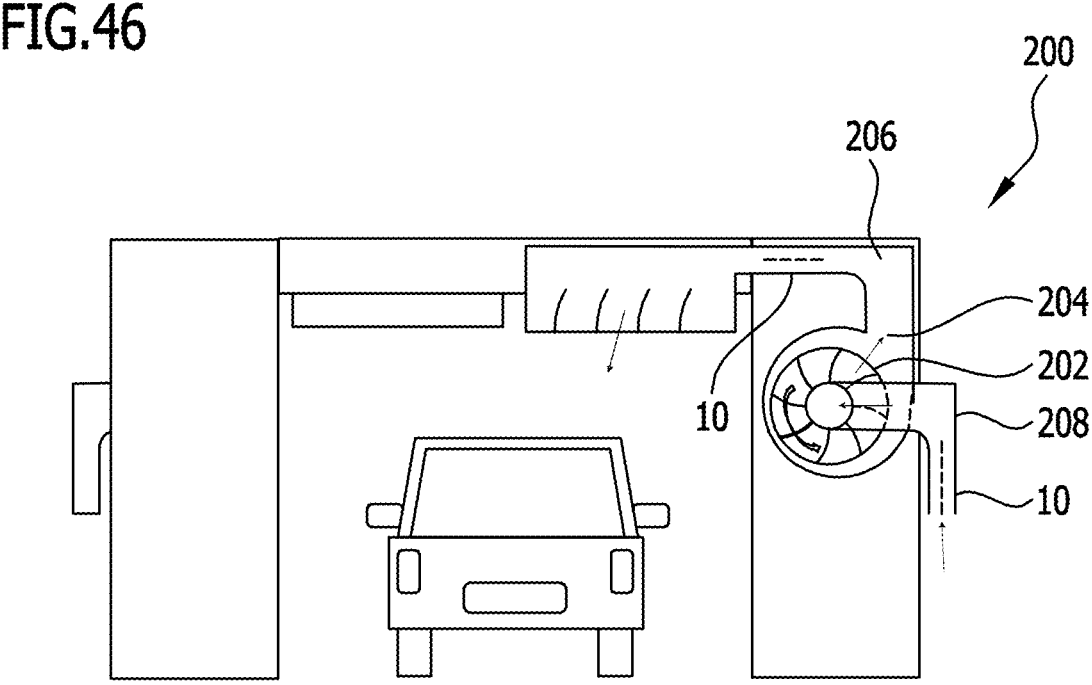
Figure 47:
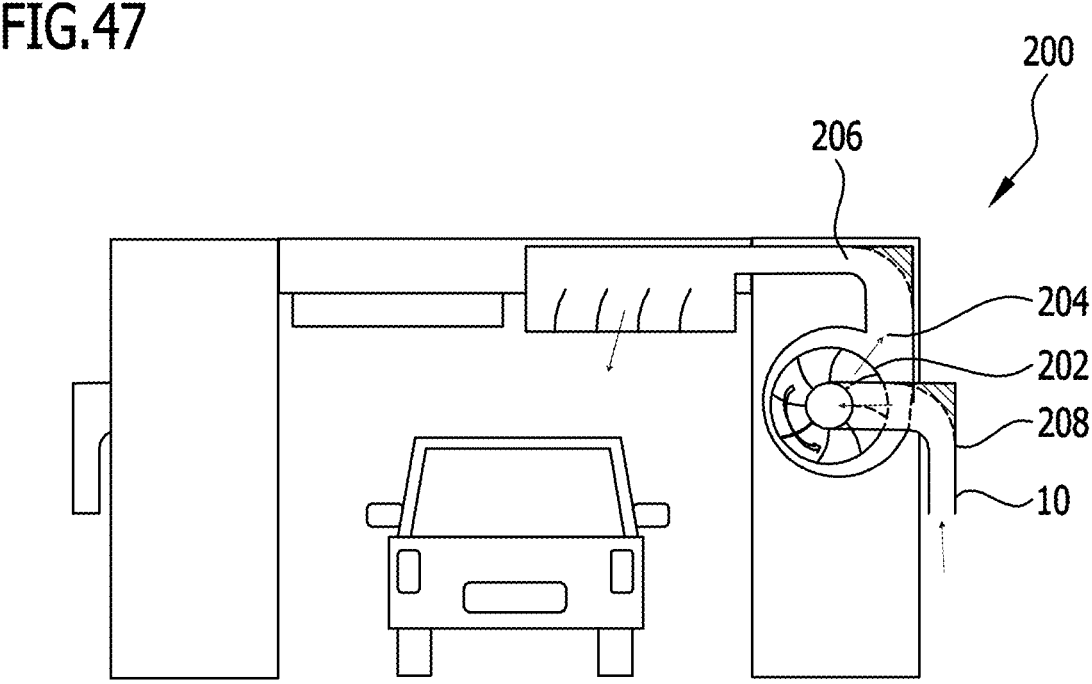

In particular, an input width is larger than an output width (FIG. 32), and/or a mode filter for transverse modes is provided (FIGS. 33, 34), and/or a built-in wall 52 is provided (FIG. 35).

A further exemplary embodiment of a cleaning apparatus according to the invention is a swabbing machine 190, wherein a walk-behind floor cleaning machine is shown in FIGS. 36 to 39. This comprises a fan 192 for generating a suction stream. The fan 192 forms the noise source. The fan 192 comprises an air guidance device 194 for exhaust air. This air guidance device 194 is or comprises a flow deflection element 10 according to the invention.

A further exemplary embodiment of a cleaning apparatus according to the invention is a municipal vehicle 196 (FIGS. 40 to 43). This takes the form for example of a vehicle with center-pivot steering. It comprises a fan 198 having an air guidance device for exhaust air, wherein a flow deflection element is correspondingly connected to this air guidance device.

A further exemplary embodiment of a cleaning apparatus according to the invention is a gantry wash 200, in particular for vehicles (FIGS. 44 to 47). This gantry wash 200 comprises a fan 202 which generates a blown stream 204. This blown stream 204 can be used to dry a vehicle.

A corresponding air guidance device 206 is provided for the blown stream, and is provided with a flow deflection element 10 according to the invention.

Further, an air guidance device 208 is provided by way of which air is supplied to the fan 198. A flow deflection element 10 according to the invention may be seated on this air guidance device 208 as well.

LIST OF REFERENCE NUMERALS 10, 10', 10", 10''' Flow deflection element
12 Duct
14 Interior
16, 16', 16", 16''' First duct arm
18, 18', 18", 18''' Second duct arm
20 First direction of extent
22 Second direction of extent
24 Region of transition
26, 26', 26", 26''' First opening
28, 28', 28", 28''' Second opening
30 Air stream
32 First width direction
34 First depth direction
36 Second width direction
38 Second depth direction
40 First delimitation plane
42 Second delimitation plane
44 External corner region
46 Internal corner region
48 Edge
50a Corner
50b Corner
52, 52' Built-in wall
54 Curved wall
56 Flow profile
58 Dead zone
60 Flow separation zone
62 Flow profile
64 Secondary stream
66 Envelope
68 Envelope
70 Envelope
72 Mode filter device
74 Mode filter (absorptive sound attenuator)
76 Absorptive sound attenuator
78 Absorptive material
80 Inner side
82 Side
84 Mode filter (chamber-type sound attenuator)
86 Chamber
88 Side
90 Mode filter (perforated device)
91 Opening
92a Side
92b Side
93 Plate
94 Through-flow region
96 Wall
98 Wall
100 Side
102 Wall element
104 Porous element
106 Center point
108 Flow deflection element
110 First opening
112 First duct arm
114 Second opening
116 Second duct arm
118 External corner region
120 Edge
122 Mode filter
124 Interior
126 Built-in wall
128 Though-flow region
130 Internal corner region
132 Region of transition
134 Suction device
136 Fan
138 Suction hose
140 Filter device
142 Air guidance device
144 Fan motor
146 Cooling fan
148 Air guidance device
150 Flow deflection element
152 High-pressure cleaner
154 Motor
156 Air guidance device 158 Wet-floor cleaner
160 Cleaning roller
162 Fan
164 Dirt-collection container
166 Fan motor
168 Air guidance device
170 Window vacuum cleaner
172 Fan
174 Air guidance device
176 Leaf blower
178 Fan
180 Blown stream
182 Air guidance device
184 Sweeper
186 Fan
188 Air guidance device
190 Swabbing machine
192 Fan
194 Air guidance device
196 Municipal vehicle
198 Fan
200 Gantry wash
202 Fan
204 Blown stream
206 Air guidance device
208 Air guidance device

The invention claimed is:

1. A cleaning apparatus, comprising at least one noise source and an air guidance device having at least one flow deflection element, wherein the at least one flow deflection element has a first duct arm, having a first duct arm depth, and a second duct arm, having a second duct arm depth, wherein the first duct arm depth and the second duct arm depth are equal to one another, wherein the second duct arm is oriented transversely to the first duct arm at a right angle, and wherein, during operation of the cleaning apparatus, there is sound propagation from the first duct arm to the second duct arm, and at a transition region from the first duct arm to the second duct arm transverse modes of sound propagation arise, wherein a mode filter device for transverse modes of sound propagation is arranged at the at least one flow deflection element, having at least one mode filter that is positioned at the second duct arm, such that a spacing of the at least one mode filter which is arranged at the second duct arm is at least 0.1 times a first width of the first duct arm in a first width direction or a second width of the second duct arm in a second width direction, wherein the spacing is parallel to a first width direction and relates to a side of the first duct arm that lies at an internal corner region of the at least one flow deflection element.

2. The cleaning apparatus as claimed in claim 1, wherein the at least one flow deflection element has a sound deflection region for sound propagation from the first duct arm to the second duct arm, and wherein in respect of sound propagation at least one mode filter for transverse modes is arranged downstream of the sound deflection region.

3. The cleaning apparatus as claimed in claim 1, wherein at least one of the following applies:
the at least one mode filter which is positioned at the second duct arm is at a spacing from a sound deflection region;
the at least one mode filter which is positioned at the second duct arm is at a spacing from the first duct arm;
a spacing of the at least one mode filter which is arranged at the second duct arm is at least 0.1 times a first width of the first duct arm in a first width direction or a second width of the second duct arm in a second width direction, wherein the spacing is parallel to a first width direction and relates to a side of the first duct arm that lies at an internal corner region of the at least one flow deflection element.

4. The cleaning apparatus as claimed in claim 1, wherein the mode filter device comprises at least one mode filter for transverse modes which is arranged at the first duct arm.

5. The cleaning apparatus as claimed in claim 1, wherein the first duct arm has a first opening that extends in a first width direction and a first depth direction, wherein the first depth direction is perpendicular to the first width direction, and wherein the second duct arm has a second opening that extends in a second width direction and a second depth direction perpendicular to the second width direction, having at least one of the following:
the first width direction and the second width direction are transverse and in particular perpendicular to one another;
the first depth direction and the second depth direction are at least approximately parallel to one another;
the first depth direction and the second width direction are perpendicular to one another;
the second depth direction and the first width direction are perpendicular to one another.

6. The cleaning apparatus as claimed in claim 5, wherein, during the propagation of sound through the at least one flow deflection element during operation of the cleaning apparatus, transverse modes that propagate in the first width direction and second width direction and transverse modes that propagate in the first depth direction and second depth direction may fundamentally be formed.

7. The cleaning apparatus as claimed in claim 5, wherein the at least one mode filter at the second duct arm takes a form for filtering transverse modes in the second width direction.

8. The cleaning apparatus as claimed in claim 1, wherein a mode filter of the mode filter device for transverse modes is or comprises at least one of the following:
an absorptive sound attenuator;
a chamber-type sound attenuator;
a perforated device that is positioned in an interior of the at least one flow deflection element.

9. The cleaning apparatus as claimed in claim 8, wherein the absorptive sound attenuator has material that is absorptive in relation to sound and is in particular arranged as an absorptive layer.

10. The cleaning apparatus as claimed in claim 9, wherein the absorptive material is flush with an inner side of the at least one flow deflection element, or is set back in relation to an inner side of the at least one flow deflection element.

11. The cleaning apparatus as claimed in claim 9, wherein the absorptive sound attenuator has at least one of the following parameters:
a thickness of the absorptive material is at least 0.1 times a width of the first duct arm or the second duct arm;
a length of the absorptive sound attenuator parallel to a direction of extent of the duct arm at which the absorptive sound attenuator is arranged is at least 1.5 times a width of the first duct arm or the second duct arm;
a spacing of the absorptive sound attenuator that is arranged at the second duct arm from the first duct arm is at least 0.1 times a width of the first duct arm or the second duct arm.

12. The cleaning apparatus as claimed in claim 7, wherein the chamber-type sound attenuator has a chamber that forms a widening in cross section at the duct arm at which the chamber-type sound attenuator is arranged.

13. The cleaning apparatus as claimed in claim 12, wherein the chamber-type sound attenuator has at least one of the following parameters:
- a width of the chamber is at least twice a width of the first duct arm or the second duct arm;
- a length of the chamber-type sound attenuator parallel to a direction of extent of the duct arm at which the chamber-type sound attenuator is arranged is at least 1.2 times a width of the first duct arm and the second duct arm;
- a spacing of the chamber-type sound attenuator that is arranged at the second duct arm from the first duct arm is at least 0.1 times a width of the first duct arm or the second duct arm.

14. The cleaning apparatus as claimed in claim 8, wherein the absorptive sound attenuator or the chamber-type sound attenuator or the perforated device takes a form for attenuation of transverse modes only in a width direction.

15. The cleaning apparatus as claimed in claim 8, wherein, in the case of the perforated device, at least one of the following is present:
- openings in the perforated device have an opening width of less than or equal to 1 mm;
- an opening density is greater than or equal to 10 openings per square centimeter;
- a wall thickness of the perforated device in a width direction of the duct arm at which the perforated device is arranged is at least 1 mm.

16. The cleaning apparatus as claimed in claim 8, wherein at least one of the following applies:
- the perforated device is or comprises one or more plates provided with openings;
- the perforated device comprises one or more open-pore structures;
- an open-pore structure takes the form of a block;
- an open-pore structure is a foam structure and in particular at least one of (i) an absorbent foam structure and (ii) a fiber material structure.

17. The cleaning apparatus as claimed in claim 1, wherein the first duct arm has a first opening and the second duct arm has a second opening, and wherein a ratio of a first width of the first opening to a second width of the second opening is greater than 1.

18. The cleaning apparatus as claimed in claim 17, wherein the ratio is greater than or equal to 1.2.

19. The cleaning apparatus as claimed in claim 17, wherein the ratio is less than or equal to 3.

20. The cleaning apparatus as claimed in claim 17, wherein the ratio is between 1.5 and 2.

21. The cleaning apparatus as claimed in claim 17, wherein the first opening is an inlet opening for sound, and the second opening is an outlet opening for sound, and during operation of the cleaning apparatus sound propagation is from the first opening to the second opening.

22. The cleaning apparatus as claimed in claim 17, wherein at least one of the following applies:
- the first duct arm extends in a first direction of extent that is a direction normal to the first opening;
- the second duct arm extends in a second direction of extent that is a direction normal to the second opening;
- the first direction of extent and the second direction of extent are transverse and in particular perpendicular to one another;
- a first width direction, in which the first width is measured, is transverse and in particular perpendicular to the first direction of extent;
- a second width direction, in which the second width is measured, is transverse and in particular perpendicular to the second direction of extent;
- the first width direction and the second direction of extent are at least approximately parallel to one another;
- the second width direction and the first direction of extent are at least approximately parallel to one another;
- the first opening has an extent in a first depth direction that is perpendicular to the first width direction and transverse to the second width direction;
- the second opening has an extent in a second depth direction that is oriented perpendicular to the second width direction and transverse and in particular perpendicular to the first width direction;
- the first width direction and the second width direction lie in a plane to which the first depth direction and the second depth direction are oriented transversely.

23. The cleaning apparatus as claimed in claim 17, wherein the first width of the first opening relates to a rectangular envelope which has sides having an extent in a first width direction and in a first depth direction perpendicular to the first width direction, and wherein the second width of the second opening relates to a rectangular envelope which has sides having an extent in a second width direction and in a second depth direction perpendicular to the second width direction.

24. The cleaning apparatus as claimed in claim 17, wherein the first opening has a rectangular envelope which has sides extending in a first width direction and in a first depth direction perpendicular to the first width direction, and wherein the second opening has a rectangular envelope which has sides extending in a second width direction and in a second depth direction perpendicular to the second width direction.

25. The cleaning apparatus as claimed in claim 17, wherein at least one of the following applies:
- the first duct arm has a uniform cross section from the first opening to a region of transition to the second duct arm;
- the second duct arm has a uniform cross section from the second opening to a region of transition to the first duct arm.

26. The cleaning apparatus as claimed in claim 17, wherein at least one of the following applies:
- the first opening has a rectangular or square cross section;
- the first duct arm has a rectangular or square internal cross section;
- the second opening has a rectangular or square cross section;
- the second duct arm has a rectangular or square internal cross section.

27. The cleaning apparatus as claimed in claim 17, wherein at least one of the following applies:
- the second width of the second opening is at least 1.2 times as large as a second depth of the second opening in a second depth direction perpendicular to a second width direction in which the second width is measured;
- the first width of the first opening is at least 1.2 times as large as a first depth of the first opening in a first depth direction perpendicular to a first width direction in which the first width is measured.

28. The cleaning apparatus as claimed in claim 1, wherein, at an external corner region, the first duct arm and the second duct arm have a common edge that extends in a depth direction transversely to a first width direction and transversely to a second width direction.

29. The cleaning apparatus as claimed in claim 1, wherein a region of transition from the first duct arm to the second duct arm has a curved wall, having at least one of the following:
  the curved wall lies opposite a common edge of the first duct arm and the second duct arm;
  an internal radius at the curved wall is greater than half of a hydraulic diameter of the first duct arm.

30. The cleaning apparatus as claimed in claim 1, wherein at least one of the following applies:
  the at least one noise source is a fan or pump;
  the air guidance device is a guidance device for process air or cooling air;
  the air guidance device is a guidance device for cleaning air, and in particular blown air;
  the air guidance device is a guidance device for drying air.

31. The cleaning apparatus as claimed in claim 1, comprising at least one tool for application to a surface that is to be cleaned.

32. The cleaning apparatus as claimed in claim 31, wherein the at least one application tool is coupled to the air guidance device.

33. The cleaning apparatus as claimed in claim 1, wherein it takes the form of a portable cleaning device or takes the form of a fixed cleaning apparatus.

34. The cleaning apparatus as claimed in claim 33, wherein it takes the form of a high-pressure cleaner, sweeper, floor-cleaning machine, swabbing machine, suction device, window vacuum cleaner, at least one of (i) a hand-held wet-floor cleaning machine and (ii) a manually guided wet-floor cleaning machine, leaf blower, or gantry wash.

35. The cleaning apparatus as claimed in claim 1, wherein the first duct arm and the second duct arm have a common edge at an external corner region, wherein arranged in an interior of the at least one flow deflection element is a built-in wall which covers the edge in the interior, wherein the built-in wall faces a through-flow region in the interior, and wherein the built-in wall takes a form such that it guides flow and is sound-permeable.

36. The cleaning apparatus as claimed in claim 35, wherein the built-in wall abuts against an inner side of the first duct arm and an inner side of the second duct arm.

37. The cleaning apparatus as claimed in claim 35, wherein at least one of the following applies:
  the built-in wall takes a form such that it is curved facing the through-flow region, and in particular is concavely curved;
  a transition of the built-in wall to an inner side of the first duct arm and the second duct arm is in each case smooth and in particular free of edges.

38. The cleaning apparatus as claimed in claim 35, wherein at least one of the following applies:
  the built-in wall is or comprises a perforated element and in particular a perforated panel element or perforated block element;
  the built-in wall is or comprises a porous foam element or porous fiber material element;
  an opening width of openings in the built-in wall toward the edge is at least $\lambda/50$, where $\lambda$ is an upper sound wavelength of relevance to noise emission;
  an opening width of openings in the built-in wall toward the edge is at least 1 mm.

39. The cleaning apparatus as claimed in claim 35, wherein at least one of the following applies:
  the edge is a connection line between opposing external corners of the at least one flow deflection element;
  at the edge, the first duct arm and the second duct arm meet at an angle of between 70° and 110° and in particular at an angle of between 80° and 100° and in particular at a right angle to one another.

40. The cleaning apparatus as claimed in claim 35, wherein the built-in wall has a constant curvature.

41. The cleaning apparatus as claimed in claim 35, wherein a center point of a circle of curvature for the built-in wall lies between the first duct arm and the second duct arm.

42. The cleaning apparatus as claimed in claim 35, wherein a region of transition from the first duct arm to the second duct arm has, at an internal corner region which lies opposite the external corner region, a wall that is curved relative to the interior of the at least one flow deflection element.

43. The cleaning apparatus as claimed in claim 42, wherein the curved wall lies opposite the built-in wall, and a through-flow region in the interior lies between the curved wall and the built-in wall.

44. The cleaning apparatus as claimed in claim 42, wherein the curved wall has a constant curvature.

45. The cleaning apparatus as claimed in claim 42, wherein a circle of curvature for the curved wall has an internal radius that is greater than half of a hydraulic diameter of a first opening of the first duct arm.

46. The cleaning apparatus as claimed in claim 42, wherein the curved wall and the built-in wall are oriented parallel and have in particular a common center point.

47. The cleaning apparatus as claimed in claim 35, wherein the built-in wall is of uniform height parallel to at least one of (i) a first depth direction and (ii) a second depth direction.

* * * * *